(12) United States Patent
Mullen et al.

(10) Patent No.: US 12,537,349 B1
(45) Date of Patent: Jan. 27, 2026

(54) SYSTEMS AND METHODS FOR AUDIO CONNECTORS FOR POWERED CARDS AND DEVICES

(71) Applicant: Dynamics Inc., Cheswick, PA (US)

(72) Inventors: Jeffrey D. Mullen, Glenshaw, PA (US); Christopher J. Rigatti, Pittsburgh, PA (US)

(73) Assignee: Dynamics Inc., Cheswick, PA (US)

( * ) Notice: Subject to any disclaimer, the term of this patent is extended or adjusted under 35 U.S.C. 154(b) by 0 days.

(21) Appl. No.: 16/882,227

(22) Filed: May 22, 2020

Related U.S. Application Data

(63) Continuation of application No. 13/049,799, filed on Mar. 16, 2011, now Pat. No. 10,693,263.

(60) Provisional application No. 61/314,523, filed on Mar. 16, 2010.

(51) Int. Cl.
*H01R 24/58* (2011.01)

(52) U.S. Cl.
CPC .................................. *H01R 24/58* (2013.01)

(58) Field of Classification Search
CPC ............................................. H01R 24/58
USPC .................................................. 235/492, 486
See application file for complete search history.

(56) References Cited

U.S. PATENT DOCUMENTS

| | | | |
|---|---|---|---|
| 4,353,064 A | 10/1982 | Stamm | |
| 4,394,654 A | 7/1983 | Hofmann-Cerfontaine | |
| 4,614,861 A | 9/1986 | Pavlov et al. | |
| 4,667,087 A | 5/1987 | Quintana | |
| 4,701,601 A | 10/1987 | Francini et al. | |
| 4,720,860 A | 1/1988 | Weiss | |
| 4,786,791 A | 11/1988 | Hodama | |
| 4,791,283 A | 12/1988 | Burkhardt | |
| 4,797,542 A | 1/1989 | Hara | |
| 5,038,251 A | 8/1991 | Sugiyama et al. | |
| 5,168,520 A | 12/1992 | Weiss | |
| 5,237,614 A | 8/1993 | Weiss | |
| 5,276,311 A | 1/1994 | Hennige | |
| 5,347,580 A | 9/1994 | Molva et al. | |
| 5,361,062 A | 11/1994 | Weiss et al. | |
| 5,412,199 A | 5/1995 | Finkelstein et al. | |
| 5,434,398 A | 7/1995 | Goldberg | |
| 5,434,405 A | 7/1995 | Finkelstein et al. | |
| 5,478,994 A | 12/1995 | Rahman | |
| 5,479,512 A | 12/1995 | Weiss | |
| 5,484,997 A | 1/1996 | Haynes | |
| 5,485,519 A | 1/1996 | Weiss | |

(Continued)

FOREIGN PATENT DOCUMENTS

| | | | | |
|---|---|---|---|---|
| JP | 05210770 A | 8/1993 | | |
| KR | 20070038164 A | * 4/2007 | .......... | H04M 1/0266 |

(Continued)

OTHER PUBLICATIONS

PCT/US11/25047, Feb. 16, 2011, Mullen.

(Continued)

*Primary Examiner* — Toan C Ly
(74) *Attorney, Agent, or Firm* — Morris Law Group; Robert W. Morris

(57) ABSTRACT

Audio connectors are provided within a card. The audio connectors may be provided having a height that is compatible with a card (e.g., less than 1 mm or less than 0.5 mm). Communications to and from the card may be provided using the audio connectors within the card.

1 Claim, 14 Drawing Sheets

(56) References Cited

U.S. PATENT DOCUMENTS

| | | |
|---|---|---|
| 5,585,787 A | 12/1996 | Wallerstein |
| 5,591,949 A | 1/1997 | Bernstein |
| 5,608,203 A | 3/1997 | Finkelstein et al. |
| 5,623,552 A | 4/1997 | Lane |
| 5,657,388 A | 8/1997 | Weiss |
| 5,834,747 A | 11/1998 | Cooper |
| 5,834,756 A | 11/1998 | Gutman et al. |
| 5,856,661 A | 1/1999 | Finkelstein et al. |
| 5,864,623 A | 1/1999 | Messina et al. |
| 5,907,142 A | 5/1999 | Kelsey |
| 5,913,203 A | 6/1999 | Wong et al. |
| 5,937,394 A | 8/1999 | Wong et al. |
| 5,955,021 A | 9/1999 | Tiffany, III |
| 5,956,699 A | 9/1999 | Wong et al. |
| 6,025,054 A | 2/2000 | Tiffany, III |
| 6,045,043 A | 4/2000 | Bashan et al. |
| 6,076,163 A | 6/2000 | Hoffstein et al. |
| 6,085,320 A | 7/2000 | Kaliski |
| 6,095,416 A | 8/2000 | Grant et al. |
| 6,130,621 A | 10/2000 | Weiss |
| 6,145,079 A | 11/2000 | Mitty et al. |
| 6,157,920 A | 12/2000 | Jakobsson et al. |
| 6,161,181 A | 12/2000 | Haynes, III et al. |
| 6,176,430 B1 | 1/2001 | Finkelstein et al. |
| 6,182,894 B1 | 2/2001 | Hackett et al. |
| 6,189,098 B1 | 2/2001 | Kaliski |
| 6,199,052 B1 | 3/2001 | Mitty et al. |
| 6,206,293 B1 | 3/2001 | Gutman et al. |
| 6,240,184 B1 | 5/2001 | Huynh et al. |
| 6,241,153 B1 | 6/2001 | Tiffany, III |
| 6,256,873 B1 | 7/2001 | Tiffany, III |
| 6,269,163 B1 | 7/2001 | Rivest et al. |
| 6,286,022 B1 | 9/2001 | Kaliski et al. |
| 6,308,890 B1 | 10/2001 | Cooper |
| 6,313,724 B1 | 11/2001 | Osterweil |
| 6,389,442 B1 | 5/2002 | Yin et al. |
| 6,393,447 B1 | 5/2002 | Jakobsson et al. |
| 6,411,715 B1 | 6/2002 | Juels |
| 6,446,052 B1 | 9/2002 | Juels |
| 6,460,141 B1 | 10/2002 | Olden |
| 6,592,044 B1 | 7/2003 | Wong et al. |
| 6,607,127 B2 | 8/2003 | Wong |
| 6,609,654 B1 | 8/2003 | Anderson et al. |
| 6,631,849 B2 | 10/2003 | Blossom |
| 6,655,585 B2 | 12/2003 | Shinn |
| 6,681,988 B2 | 1/2004 | Stack et al. |
| 6,705,520 B1 | 3/2004 | Pitroda et al. |
| 6,755,341 B1 | 6/2004 | Wong et al. |
| 6,764,005 B2 | 7/2004 | Cooper |
| 6,769,618 B1 | 8/2004 | Finkelstein |
| 6,805,288 B2 | 10/2004 | Routhenstein et al. |
| 6,811,082 B2 | 11/2004 | Wong |
| 6,813,354 B1 | 11/2004 | Jakobsson et al. |
| 6,817,532 B2 | 11/2004 | Finkelstein |
| 6,873,974 B1 | 3/2005 | Schutzer |
| 6,902,116 B2 | 6/2005 | Finkelstein |
| 6,970,070 B2 | 11/2005 | Juels et al. |
| 6,980,969 B1 | 12/2005 | Tuchler et al. |
| 6,985,583 B1 | 1/2006 | Brainard et al. |
| 6,991,155 B2 | 1/2006 | Burchette, Jr. |
| 7,013,030 B2 | 3/2006 | Wong et al. |
| 7,035,443 B2 | 4/2006 | Wong |
| 7,039,223 B2 | 5/2006 | Wong |
| 7,044,394 B2 | 5/2006 | Brown |
| 7,051,929 B2 | 5/2006 | Li |
| 7,083,094 B2 | 8/2006 | Cooper |
| 7,100,049 B2 | 8/2006 | Gasparini et al. |
| 7,100,821 B2 | 9/2006 | Rasti |
| 7,111,172 B1 | 9/2006 | Duane et al. |
| 7,114,652 B2 | 10/2006 | Moullette et al. |
| 7,136,514 B1 | 11/2006 | Wong |
| 7,140,550 B2 | 11/2006 | Ramachandran |
| 7,147,156 B2 | 12/2006 | Divine et al. |
| 7,163,153 B2 | 1/2007 | Blossom |
| 7,195,154 B2 | 3/2007 | Routhenstein |
| 7,197,639 B1 | 3/2007 | Juels et al. |
| 7,219,368 B2 | 5/2007 | Juels et al. |
| 7,225,537 B2 | 6/2007 | Reed |
| 7,225,994 B2 | 6/2007 | Finkelstein |
| 7,246,752 B2 | 7/2007 | Brown |
| 7,298,243 B2 | 11/2007 | Juels et al. |
| 7,334,732 B2 | 2/2008 | Cooper |
| 7,337,326 B2 | 2/2008 | Palmer et al. |
| 7,346,775 B2 | 3/2008 | Gasparini et al. |
| 7,356,696 B1 | 4/2008 | Jakobsson et al. |
| 7,357,319 B1 | 4/2008 | Lin et al. |
| 7,359,507 B2 | 4/2008 | Kaliski |
| 7,360,688 B1 | 4/2008 | Harris |
| 7,363,494 B2 | 4/2008 | Brainard et al. |
| 7,380,710 B2 | 6/2008 | Brown |
| 7,398,253 B1 | 7/2008 | Pinnell |
| 7,404,087 B2 | 7/2008 | Teunen |
| 7,424,570 B2 | 9/2008 | D'Albore et al. |
| 7,427,033 B1 | 9/2008 | Roskind |
| 7,445,516 B2 | 11/2008 | Chung et al. |
| 7,454,349 B2 | 11/2008 | Teunen et al. |
| 7,461,250 B1 | 12/2008 | Duane et al. |
| 7,461,399 B2 | 12/2008 | Juels et al. |
| 7,472,093 B2 | 12/2008 | Juels |
| 7,472,829 B2 | 1/2009 | Brown |
| 7,494,055 B2 | 2/2009 | Fernandes et al. |
| 7,502,467 B2 | 3/2009 | Brainard et al. |
| 7,502,933 B2 | 3/2009 | Jakobsson et al. |
| 7,503,485 B1 | 3/2009 | Routhenstein |
| 7,516,492 B1 | 4/2009 | Nisbet et al. |
| 7,523,301 B2 | 4/2009 | Nisbet et al. |
| 7,530,495 B2 | 5/2009 | Cooper |
| 7,532,104 B2 | 5/2009 | Juels |
| 7,543,739 B2 | 6/2009 | Brown et al. |
| 7,559,464 B2 | 7/2009 | Routhenstein |
| 7,562,221 B2 | 7/2009 | Nystrom et al. |
| 7,562,222 B2 | 7/2009 | Gasparini et al. |
| 7,580,898 B2 | 8/2009 | Brown et al. |
| 7,584,153 B2 | 9/2009 | Brown et al. |
| 7,591,426 B2 | 9/2009 | Osterweil et al. |
| 7,591,427 B2 | 9/2009 | Osterweil |
| 7,602,904 B2 | 10/2009 | Juels et al. |
| 7,631,804 B2 | 12/2009 | Brown |
| 7,639,537 B2 | 12/2009 | Sepe et al. |
| 7,641,124 B2 | 1/2010 | Brown et al. |
| 7,660,902 B2 | 2/2010 | Graham et al. |
| 7,784,687 B2 | 8/2010 | Mullen et al. |
| 7,793,851 B2 | 9/2010 | Mullen |
| 7,828,207 B2 | 11/2010 | Cooper |
| 7,828,220 B2 | 11/2010 | Mullen |
| 7,841,538 B2 | 11/2010 | Robertson et al. |
| 7,931,195 B2 | 4/2011 | Mullen |
| 7,954,705 B2 | 6/2011 | Mullen |
| 8,011,577 B2 | 9/2011 | Mullen et al. |
| 8,020,775 B2 | 9/2011 | Mullen et al. |
| 8,066,191 B1 | 11/2011 | Cloutier et al. |
| 8,074,877 B2 | 12/2011 | Mullen et al. |
| 8,172,148 B1 | 5/2012 | Cloutier et al. |
| 8,282,007 B1 | 10/2012 | Cloutier et al. |
| 8,286,876 B2 | 10/2012 | Mullen et al. |
| 8,302,872 B2 | 11/2012 | Mullen |
| 8,348,172 B1 | 1/2013 | Cloutier et al. |
| 8,382,000 B2 | 2/2013 | Mullen et al. |
| 8,393,545 B1 | 3/2013 | Mullen et al. |
| 8,393,546 B1 | 3/2013 | Yen et al. |
| 8,413,892 B2 | 4/2013 | Mullen et al. |
| 8,424,773 B2 | 4/2013 | Mullen et al. |
| 8,459,548 B2 | 6/2013 | Mullen et al. |
| 8,485,437 B2 | 7/2013 | Mullen et al. |
| 8,511,574 B1 | 8/2013 | Yen et al. |
| 8,517,276 B2 | 8/2013 | Mullen et al. |
| 8,523,059 B1 | 9/2013 | Mullen et al. |
| 8,573,503 B1 | 11/2013 | Cloutier et al. |
| 8,579,203 B1 | 11/2013 | Lambeth et al. |
| 8,590,796 B1 | 11/2013 | Cloutier et al. |
| 8,602,312 B2 | 12/2013 | Cloutier et al. |
| 8,608,083 B2 | 12/2013 | Mullen et al. |
| 8,622,309 B1 | 1/2014 | Mullen et al. |
| 8,668,143 B2 | 3/2014 | Mullen et al. |

(56) References Cited

U.S. PATENT DOCUMENTS

| | | |
|---|---|---|
| 8,727,219 B1 | 5/2014 | Mullen |
| 8,733,638 B2 | 5/2014 | Mullen et al. |
| 8,746,579 B1 | 6/2014 | Cloutier et al. |
| 8,757,483 B1 | 6/2014 | Mullen et al. |
| 8,757,499 B2 | 6/2014 | Cloutier et al. |
| 8,814,050 B1 | 8/2014 | Mullen et al. |
| 8,875,999 B2 | 11/2014 | Mullen et al. |
| 8,881,989 B2 | 11/2014 | Mullen et al. |
| 8,931,703 B1 | 1/2015 | Mullen et al. |
| 8,973,824 B2 | 3/2015 | Mullen et al. |
| 9,004,368 B2 | 4/2015 | Mullen et al. |
| 9,010,630 B2 | 4/2015 | Mullen et al. |
| 9,064,255 B1 | 6/2015 | Mullen et al. |
| 9,292,843 B1 | 3/2016 | Mullen et al. |
| 9,306,666 B1 | 4/2016 | Zhang et al. |
| 9,329,619 B1 | 5/2016 | Cloutier |
| 9,361,569 B2 | 6/2016 | Mullen et al. |
| 9,373,069 B2 | 6/2016 | Cloutier et al. |
| 9,384,438 B2 | 7/2016 | Mullen et al. |
| 9,639,796 B2 | 5/2017 | Mullen et al. |
| 9,652,436 B1 | 5/2017 | Yen et al. |
| 9,684,861 B2 | 6/2017 | Mullen et al. |
| 9,697,454 B2 | 7/2017 | Mullen et al. |
| 9,704,088 B2 | 7/2017 | Mullen et al. |
| 9,704,089 B2 | 7/2017 | Mullen et al. |
| 9,727,813 B2 | 8/2017 | Mullen et al. |
| 9,805,297 B2 | 10/2017 | Mullen et al. |
| 9,852,368 B1 | 12/2017 | Yen et al. |
| 9,875,437 B2 | 1/2018 | Cloutier et al. |
| 9,928,456 B1 | 3/2018 | Cloutier et al. |
| 9,953,255 B1 | 4/2018 | Yen et al. |
| 10,032,100 B2 | 7/2018 | Mullen et al. |
| 10,095,974 B1 | 10/2018 | Mullen et al. |
| 10,169,692 B2 | 1/2019 | Mullen et al. |
| 10,176,419 B1 | 1/2019 | Cloutier et al. |
| 10,181,097 B1 | 1/2019 | Mullen et al. |
| 10,198,687 B2 | 2/2019 | Mullen et al. |
| 10,223,631 B2 | 3/2019 | Mullen et al. |
| 10,255,545 B2 | 4/2019 | Mullen et al. |
| 10,325,199 B2 | 6/2019 | Mullen et al. |
| 10,430,704 B2 | 10/2019 | Mullen et al. |
| 10,467,521 B2 | 11/2019 | Mullen et al. |
| 10,482,363 B1 | 11/2019 | Cloutier et al. |
| 10,496,918 B2 | 12/2019 | Mullen et al. |
| 10,579,920 B2 | 3/2020 | Mullen et al. |
| 10,948,964 B1 | 3/2021 | Cloutier |
| 10,997,489 B2 | 5/2021 | Mullen et al. |
| 11,062,195 B2 | 7/2021 | Mullen et al. |
| 11,144,909 B1 | 10/2021 | Mullen et al. |
| 11,238,329 B2 | 2/2022 | Mullen et al. |
| 2001/0034702 A1 | 10/2001 | Mockett et al. |
| 2001/0047335 A1 | 11/2001 | Arndt et al. |
| 2002/0059114 A1 | 5/2002 | Cockrill et al. |
| 2002/0082989 A1 | 6/2002 | Fife et al. |
| 2002/0096570 A1 | 7/2002 | Wong et al. |
| 2002/0120583 A1 | 8/2002 | Keresman, III et al. |
| 2003/0034388 A1 | 2/2003 | Routhenstein et al. |
| 2003/0052168 A1 | 3/2003 | Wong |
| 2003/0057278 A1 | 3/2003 | Wong |
| 2003/0116635 A1 | 6/2003 | Taban |
| 2003/0152253 A1 | 8/2003 | Wong |
| 2003/0163287 A1 | 8/2003 | Vock et al. |
| 2003/0173409 A1 | 9/2003 | Vogt et al. |
| 2003/0179909 A1 | 9/2003 | Wong et al. |
| 2003/0179910 A1 | 9/2003 | Wong |
| 2003/0207603 A1* | 11/2003 | Potega .................. H01R 24/58 439/218 |
| 2003/0226899 A1 | 12/2003 | Finkelstein |
| 2004/0035942 A1 | 2/2004 | Silverman |
| 2004/0133787 A1 | 7/2004 | Doughty |
| 2004/0162732 A1 | 8/2004 | Rahim et al. |
| 2004/0172535 A1 | 9/2004 | Jakobsson |
| 2004/0177045 A1 | 9/2004 | Brown |
| 2005/0043997 A1 | 2/2005 | Sohata et al. |
| 2005/0080747 A1 | 4/2005 | Anderson et al. |
| 2005/0086160 A1 | 4/2005 | Wong et al. |
| 2005/0086177 A1 | 4/2005 | Anderson et al. |
| 2005/0116026 A1 | 6/2005 | Burger et al. |
| 2005/0119940 A1 | 6/2005 | Concilio et al. |
| 2005/0154643 A1 | 7/2005 | Doan et al. |
| 2005/0228959 A1 | 10/2005 | D'Albore et al. |
| 2006/0000900 A1 | 1/2006 | Fernandes et al. |
| 2006/0037073 A1 | 2/2006 | Juels et al. |
| 2006/0041759 A1 | 2/2006 | Kaliski et al. |
| 2006/0085328 A1 | 4/2006 | Cohen et al. |
| 2006/0091223 A1 | 5/2006 | Zellner |
| 2006/0161435 A1 | 7/2006 | Atef et al. |
| 2006/0163353 A1 | 7/2006 | Moulette et al. |
| 2006/0174104 A1 | 8/2006 | Crichton et al. |
| 2006/0196931 A1 | 9/2006 | Holtmanns et al. |
| 2006/0199435 A1 | 9/2006 | Foo et al. |
| 2006/0255161 A1 | 11/2006 | Bonneau et al. |
| 2006/0256961 A1 | 11/2006 | Brainard et al. |
| 2007/0034700 A1 | 2/2007 | Poidomani et al. |
| 2007/0114274 A1 | 5/2007 | Gibbs et al. |
| 2007/0124321 A1 | 5/2007 | Szydlo |
| 2007/0152070 A1 | 7/2007 | D'Albore |
| 2007/0152072 A1 | 7/2007 | Frallicciardi et al. |
| 2007/0153487 A1 | 7/2007 | Frallicciardi et al. |
| 2007/0174614 A1 | 7/2007 | Duane et al. |
| 2007/0192249 A1 | 8/2007 | Biffle et al. |
| 2007/0241183 A1 | 10/2007 | Brown et al. |
| 2007/0241201 A1 | 10/2007 | Brown et al. |
| 2007/0256123 A1 | 11/2007 | Duane et al. |
| 2007/0291753 A1 | 12/2007 | Romano |
| 2008/0005510 A1 | 1/2008 | Sepe et al. |
| 2008/0008315 A1 | 1/2008 | Fontana et al. |
| 2008/0008322 A1 | 1/2008 | Fontana et al. |
| 2008/0010675 A1 | 1/2008 | Massascusa et al. |
| 2008/0016351 A1 | 1/2008 | Fontana et al. |
| 2008/0019507 A1 | 1/2008 | Fontana et al. |
| 2008/0028447 A1 | 1/2008 | O'Malley et al. |
| 2008/0029607 A1 | 2/2008 | Mullen |
| 2008/0035738 A1 | 2/2008 | Mullen |
| 2008/0040271 A1 | 2/2008 | Hammad et al. |
| 2008/0040276 A1 | 2/2008 | Hammad et al. |
| 2008/0054068 A1 | 3/2008 | Mullen |
| 2008/0054079 A1 | 3/2008 | Mullen |
| 2008/0054081 A1 | 3/2008 | Mullen |
| 2008/0058016 A1 | 3/2008 | Di Maggio et al. |
| 2008/0059379 A1 | 3/2008 | Ramaci et al. |
| 2008/0065555 A1 | 3/2008 | Mullen |
| 2008/0084795 A1* | 4/2008 | Hertz .................. G11B 33/06 369/30.83 |
| 2008/0096326 A1 | 4/2008 | Reed |
| 2008/0126398 A1 | 5/2008 | Cimino |
| 2008/0128515 A1 | 6/2008 | Di Iorio |
| 2008/0148394 A1 | 6/2008 | Poidomani et al. |
| 2008/0201264 A1 | 8/2008 | Brown et al. |
| 2008/0209550 A1 | 8/2008 | Di Iorio |
| 2008/0288699 A1 | 11/2008 | Chichierchia |
| 2008/0294930 A1 | 11/2008 | Varone et al. |
| 2008/0302869 A1 | 12/2008 | Mullen |
| 2008/0302876 A1 | 12/2008 | Mullen |
| 2008/0302877 A1 | 12/2008 | Musella et al. |
| 2008/0306774 A1 | 12/2008 | George et al. |
| 2009/0013122 A1 | 1/2009 | Sepe et al. |
| 2009/0036147 A1 | 2/2009 | Romano |
| 2009/0046522 A1 | 2/2009 | Sepe et al. |
| 2009/0048971 A1 | 2/2009 | Hathaway et al. |
| 2009/0108064 A1 | 4/2009 | Fernandes et al. |
| 2009/0150295 A1 | 6/2009 | Hatch et al. |
| 2009/0152365 A1 | 6/2009 | Li et al. |
| 2009/0159663 A1 | 6/2009 | Mullen et al. |
| 2009/0159667 A1 | 6/2009 | Mullen et al. |
| 2009/0159668 A1 | 6/2009 | Mullen et al. |
| 2009/0159669 A1 | 6/2009 | Mullen et al. |
| 2009/0159670 A1 | 6/2009 | Mullen et al. |
| 2009/0159671 A1 | 6/2009 | Mullen et al. |
| 2009/0159672 A1 | 6/2009 | Mullen et al. |
| 2009/0159673 A1 | 6/2009 | Mullen et al. |
| 2009/0159680 A1 | 6/2009 | Mullen et al. |
| 2009/0159681 A1 | 6/2009 | Mullen et al. |
| 2009/0159682 A1 | 6/2009 | Mullen et al. |

(56) References Cited

U.S. PATENT DOCUMENTS

| | | |
|---|---|---|
| 2009/0159688 A1 | 6/2009 | Mullen et al. |
| 2009/0159689 A1 | 6/2009 | Mullen et al. |
| 2009/0159690 A1 | 6/2009 | Mullen et al. |
| 2009/0159696 A1 | 6/2009 | Mullen |
| 2009/0159697 A1 | 6/2009 | Mullen et al. |
| 2009/0159698 A1 | 6/2009 | Mullen et al. |
| 2009/0159699 A1 | 6/2009 | Mullen et al. |
| 2009/0159700 A1 | 6/2009 | Mullen et al. |
| 2009/0159701 A1 | 6/2009 | Mullen et al. |
| 2009/0159702 A1 | 6/2009 | Mullen |
| 2009/0159703 A1 | 6/2009 | Mullen et al. |
| 2009/0159704 A1 | 6/2009 | Mullen et al. |
| 2009/0159705 A1 | 6/2009 | Mullen et al. |
| 2009/0159706 A1 | 6/2009 | Mullen et al. |
| 2009/0159707 A1 | 6/2009 | Mullen et al. |
| 2009/0159708 A1 | 6/2009 | Mullen et al. |
| 2009/0159709 A1 | 6/2009 | Mullen |
| 2009/0159710 A1 | 6/2009 | Mullen et al. |
| 2009/0159711 A1 | 6/2009 | Mullen et al. |
| 2009/0159712 A1 | 6/2009 | Mullen et al. |
| 2009/0159713 A1 | 6/2009 | Mullen et al. |
| 2009/0160617 A1 | 6/2009 | Mullen et al. |
| 2009/0242648 A1 | 10/2009 | Di Sirio et al. |
| 2009/0244858 A1 | 10/2009 | Di Sirio et al. |
| 2009/0253460 A1 | 10/2009 | Varone et al. |
| 2009/0255996 A1 | 10/2009 | Brown et al. |
| 2009/0290704 A1 | 11/2009 | Cimino |
| 2009/0303885 A1 | 12/2009 | Longo |
| 2009/0307511 A1 | 12/2009 | Fiennes et al. |
| 2009/0308921 A1 | 12/2009 | Mullen |
| 2010/0009575 A1 | 1/2010 | Crooljmans |
| 2010/0108762 A1 | 5/2010 | Morley, Jr. |
| 2010/0272252 A1 | 10/2010 | Johnson et al. |
| 2010/0314446 A1 | 12/2010 | Morley, Jr. |
| 2011/0028184 A1 | 2/2011 | Cooper |
| 2011/0116750 A1* | 5/2011 | Terlizzi ............... G02B 6/3817 385/88 |
| 2011/0201213 A1 | 8/2011 | Dabov et al. |
| 2011/0272465 A1 | 11/2011 | Mullen et al. |
| 2011/0272466 A1 | 11/2011 | Mullen et al. |
| 2011/0272467 A1 | 11/2011 | Mullen et al. |
| 2011/0272471 A1 | 11/2011 | Mullen |
| 2011/0272472 A1 | 11/2011 | Mullen |
| 2011/0272473 A1 | 11/2011 | Mullen et al. |
| 2011/0272474 A1 | 11/2011 | Mullen et al. |
| 2011/0272475 A1 | 11/2011 | Mullen et al. |
| 2011/0272476 A1 | 11/2011 | Mullen et al. |
| 2011/0272477 A1 | 11/2011 | Mullen et al. |
| 2011/0272478 A1 | 11/2011 | Mullen |
| 2011/0272479 A1 | 11/2011 | Mullen |
| 2011/0272480 A1 | 11/2011 | Mullen et al. |
| 2011/0272481 A1 | 11/2011 | Mullen et al. |
| 2011/0272482 A1 | 11/2011 | Mullen et al. |
| 2011/0272483 A1 | 11/2011 | Mullen et al. |
| 2011/0272484 A1 | 11/2011 | Mullen et al. |
| 2011/0276380 A1 | 11/2011 | Mullen et al. |
| 2011/0276381 A1 | 11/2011 | Mullen et al. |
| 2011/0276416 A1 | 11/2011 | Mullen et al. |
| 2011/0276424 A1 | 11/2011 | Mullen |
| 2011/0276425 A1 | 11/2011 | Mullen |
| 2011/0276436 A1 | 11/2011 | Mullen et al. |
| 2011/0276437 A1 | 11/2011 | Mullen et al. |
| 2011/0278364 A1 | 11/2011 | Mullen et al. |
| 2011/0282753 A1 | 11/2011 | Mullen et al. |
| 2011/0300751 A1 | 12/2011 | Wittenberg et al. |
| 2012/0037709 A1 | 2/2012 | Cloutier et al. |
| 2012/0286037 A1 | 11/2012 | Mullen et al. |
| 2012/0318871 A1 | 12/2012 | Mullen et al. |
| 2012/0326013 A1 | 12/2012 | Cloutier et al. |
| 2013/0020396 A1 | 1/2013 | Mullen et al. |
| 2013/0282573 A1 | 10/2013 | Mullen et al. |
| 2013/0282575 A1 | 10/2013 | Mullen et al. |
| 2014/0054384 A1 | 2/2014 | Cloutier et al. |
| 2015/0186766 A1 | 7/2015 | Mullen et al. |
| 2016/0162713 A1 | 6/2016 | Cloutier et al. |
| 2016/0180209 A1 | 6/2016 | Mullen et al. |
| 2016/0239735 A1 | 8/2016 | Mullen et al. |
| 2016/0283837 A1 | 9/2016 | Mullen et al. |
| 2016/0307085 A1 | 10/2016 | Mullen et al. |
| 2016/0335529 A1 | 11/2016 | Mullen et al. |
| 2016/0342876 A1 | 11/2016 | Mullen et al. |
| 2016/0342877 A1 | 11/2016 | Mullen et al. |
| 2016/0342878 A1 | 11/2016 | Mullen et al. |
| 2016/0342879 A1 | 11/2016 | Mullen et al. |
| 2016/0342880 A1 | 11/2016 | Mullen et al. |
| 2017/0286817 A1 | 10/2017 | Mullen et al. |
| 2017/0300796 A1 | 10/2017 | Mullen et al. |
| 2018/0053079 A1 | 2/2018 | Cloutier et al. |
| 2019/0042903 A1 | 2/2019 | Cloutier et al. |
| 2019/0065928 A1 | 2/2019 | Mullen et al. |
| 2019/0197387 A1 | 6/2019 | Mullen et al. |
| 2019/0340484 A1 | 11/2019 | Mullen et al. |

FOREIGN PATENT DOCUMENTS

| | | |
|---|---|---|
| WO | WO9852735 | 11/1998 |
| WO | WO0247019 | 6/2002 |
| WO | WO06066322 | 6/2006 |
| WO | WO06080929 | 8/2006 |
| WO | WO06105092 | 10/2006 |
| WO | WO06116772 | 11/2006 |
| WO | WO08064403 | 6/2008 |

OTHER PUBLICATIONS

PCT/US11/37041, May 18, 2011, Mullen et al.
PCT/US11/45991, Jul. 29, 2011, Mullen et al.
PCT/US12/31919, Apr. 2, 2012, Mullen et al.
PCT/US12/31921, Apr. 2, 2012, Mullen et al.
PCT/US12/37237, May 10, 2012, Mullen et al.
PCT/US13/26746, Feb. 19, 2013, Mullen et al.
U.S. Appl. No. 60/594,300, Poidomani et al.
U.S. Appl. No. 60/675,388, Poidomani et al.
The Bank Credit Card Business. Second Edition, American Bankers Association, Washington, D.C., 1996.
A Day in the Life of a Flux Reversal. http://www.phrack/org/issues.html?issue=37&id=6#article. As viewed on Apr. 12, 2010.
Dynamic Virtual Credit Card Nos. http://homes.cerias.purdue.edu/~jtli/paper/fc07.pdf. As viewed on Apr. 12, 2010.
English translation of JP 05210770 A.

* cited by examiner

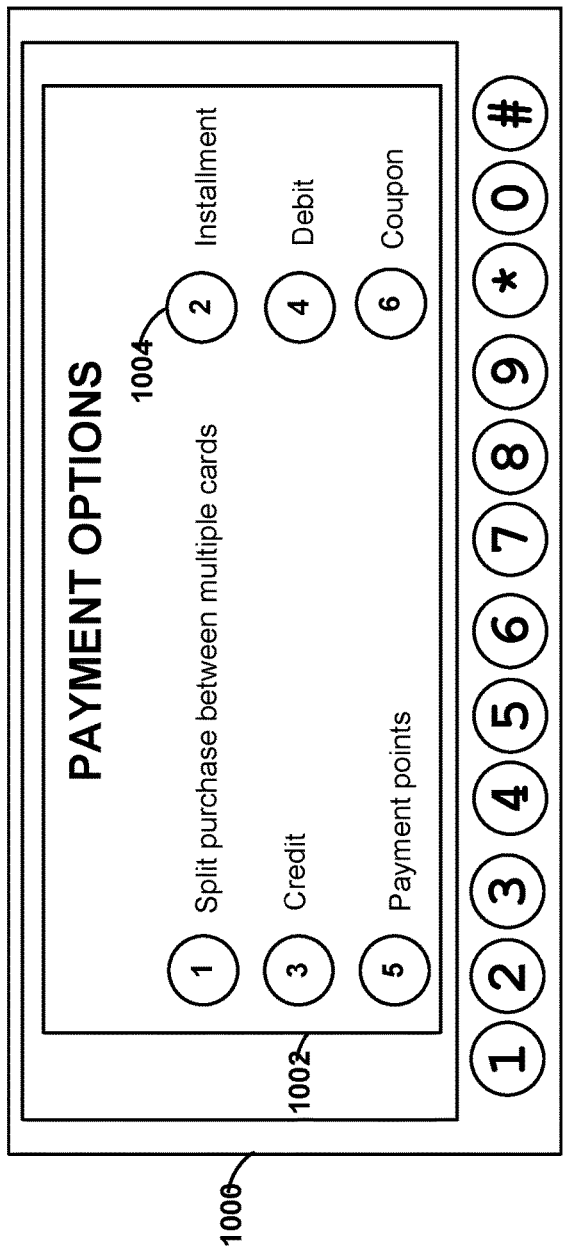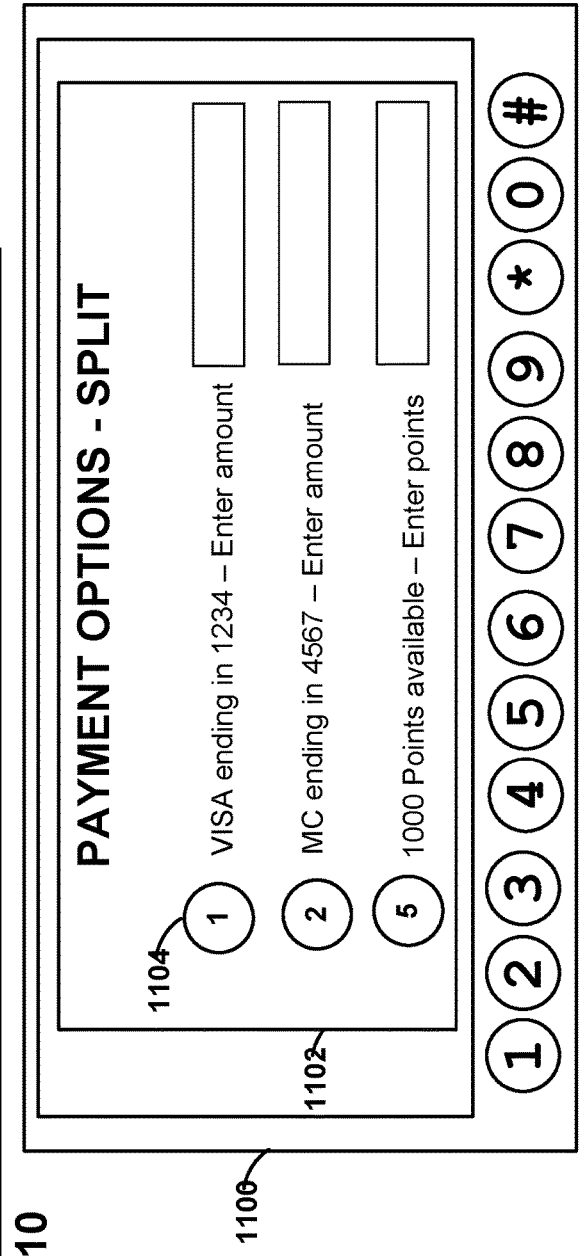

ID# SYSTEMS AND METHODS FOR AUDIO CONNECTORS FOR POWERED CARDS AND DEVICES

CROSS-REFERENCE TO RELATED APPLICATION

This application is a continuation of U.S. Non-Provisional patent application Ser. No. 13/049,799, titled SYSTEMS AND METHODS FOR AUDIO CONNECTORS FOR POWERED CARDS AND DEVICES," filed Mar. 16, 2011, which claims the benefit of U.S. Provisional Patent Application No. 61/314,523, titled "SYSTEMS AND METHODS FOR AUDIO CONNECTORS FOR POWERED CARDS AND DEVICES," filed Mar. 16, 2010, which is hereby incorporated by reference herein in its entirety.

BACKGROUND OF THE INVENTION

This invention relates to powered cards and devices and associated payment systems.

SUMMARY OF THE INVENTION

A card may include a dynamic magnetic communications device. Such a dynamic magnetic communications device may take the form of a magnetic encoder or a magnetic emulator. A magnetic encoder may change the information located on a magnetic medium such that a magnetic stripe reader may read changed magnetic information from the magnetic medium. A magnetic emulator may generate electromagnetic fields that directly communicate data to a magnetic stripe reader. Such a magnetic emulator may communicate data serially to a read-head of the magnetic stripe reader.

All, or substantially all, of the front as well as the back of a card may be a display (e.g., bi-stable, non bi-stable, LCD, LED, or electrochromic display). Electrodes of a display may be coupled to one or more capacitive touch sensors such that a display may be provided as a touch-screen display. Any type of touch-screen display may be utilized. Such touch-screen displays may be operable in determining multiple points of touch. Accordingly, a barcode may be displayed across all, or substantially all, of a surface of a card. In doing so, computer vision equipment such as barcode readers may be less susceptible to errors in reading a displayed barcode.

A card may include a number of output devices to output dynamic information. For example, a card may include one or more RFIDs or IC chips to communicate to one or more RFID readers or IC chip readers, respectively. A card may include devices to receive information. For example, an RFID and IC chip may both receive information and communicate information to an RFID and IC chip reader, respectively. A device for receiving wireless information signals may be provided. A light sensing device or sound sensing device may be utilized to receive information wirelessly. A card may include a central processor that communicates data through one or more output devices (e.g., an RFID, IC chip, and a dynamic magnetic stripe communications device). The central processor may receive information from one or more input devices (e.g., an RFID, IC chip, dynamic magnetic stripe devices, light sensing device, and a sound sensing device). A processor may be coupled to surface contacts such that the processor may perform the processing capabilities of, for example, an EMV chip. The processor may be laminated over and not exposed such that such a processor is not exposed on the surface of the card.

A card may be provided with a connector, such as an audio connector (e.g., an audio jack or an audio port), to communicate and/or receive information. For example, a card may include one or more audio jacks to communicate with one or more external devices (e.g., mobile telephonic devices) coupled to the card via the one or more audio jacks. The audio jacks may, for example, include a single conductor for communicating information. A processor may be provided on the card that may be coupled to the single conductor. The processor may communicate and/or receive information via the single conductor. The card may receive power from an external device that may be coupled to the card via the audio jack.

A card may be provided with one or more audio jacks having multiple conductors for communicating information. A processor may be provided on the card that may be coupled to the multiple conductors of the one or more audio jacks. The processor may communicate and/or receive information via the multiple conductors to external devices (e.g., laptop computers, desktop computers, mobile telephonic devices, or PDAs). The processor may communicate information on one conductor and receive information on another conductor at the same time. The processor may communicate and/or receive information differentially on multiple conductors.

A card may be provided with an audio jack having, for example, male oriented connectivity and/or an audio port having, for example, female oriented connectivity. The connectors may include one or more conductors. The card may include slots that may contain the audio jacks and/or audio ports. A mechanism may be provided on the card that when actuated, an audio jack may project away from a card (e.g., project away from a slot on a card). Accordingly, an external device may be electrically and/or mechanically coupled to the card via the audio jack. Actuating a mechanism may cause the audio jack to retract back into the card (e.g., retract back into a slot on the card). The audio jack may be completely, or partially, enclosed within a slot on a card such that no portion, or a portion, of the audio jack, for example, extends beyond an outer perimeter of the card.

An external device may be coupled to a card via an audio jack contained within the card. The card may contain a processor that is coupled to one or more conductors of an audio jack. Information may be communicated from the processor to the external device via the audio jack. Information may be communicated from the external device to the processor via the audio jack. Information may be communicated and received by the processor and the external device at the same time via the audio jack.

For example, the card may be a payment card (e.g., debit, credit, gift, or prepaid card) or other card (e.g., identification, security, or medical card) and may communicate data to an external device via an audio jack. This information may include, for example, payment information stored on the card, such as one, two, or three tracks of magnetic stripe data that includes a payment card number (e.g., credit or debit card number). The information, for example, may not be associated with any payment data.

A card may be provided with dimensions substantially the same as the dimensions of a credit card or a debit card. An audio jack contained within such a card may be provided having dimensions that are compatible with the dimensions of the card. Accordingly, the audio jack contained within the card does not change the dimensions (e.g., a height dimension) of the card. For example, the thickness of a card may be approximately less than 1 mm (e.g., less than 0.8 mm).

A card coupled to an external device (e.g., connected via an audio jack contained within the card) may communicate and/or receive any type of signal. For example, power signals may be received via an audio jack contained within the card to, for example, recharge a battery contained within the card. Application data may, for example, be received via an audio jack contained within the card and may be stored within memory contained within the card. Data and associated hand shaking may, for example, be exchanged between the card and an external device via an audio jack contained within the card. Features of the card may, for example, be defined and communicated via an audio jack contained within the card.

Magnetic stripe data may, for example, be communicated from a card to an external device (e.g., a mobile telephonic device) such that the external device may initiate a payment transaction using the received magnetic stripe data. Accordingly, for example, a mobile phone may launch an application, a user may select one or more items to purchase on the application (or enter in an amount), the application may receive payment magnetic stripe information from a card via the phone's audio jack, and authorize the transaction using the received information. After the payment is processed, the received magnetic stripe data may be erased by the phone.

Magnetic stripe data may be communicated from a card to an external device (e.g., another card) via an audio jack of a card. Information may be communicated in one direction or two directions. A card may include a port that couples to an external device via a cable. A cable may be provided having one end that couples to a card and another end that couples to an external device.

Information may, for example, be communicated from one card to another card. Information may, for example, be exchanged simultaneously between one card and another card. Accordingly, for example, cardholder information may be transferred from one card (e.g., an expired card) to another card (e.g., a new card) when replacing an expired card with a new card.

Information exchanged between two cards may include payment data. Such payment data may include, for example, a credit balance and a merchant identifier. Accordingly, for example, a credit balance and a merchant identifier may be transferred from one card (e.g., a gift card) to another card (e.g., a gift card) to consolidate credit balance and merchant identification data onto a single gift card.

A card may include one or more buttons. Manual input received from one or more of the buttons (e.g., one or more button presses) may cause information to be communicated from the card to an external device. Accordingly, for example, a button press may cause one track of magnetic stripe data to be communicated by a card to an external device via an audio jack on the card. Pressing another button on the card may, for example, cause two tracks of magnetic stripe data to be communicated by a card to an external device via an audio jack on the card. Pressing yet another button on the card may, for example, cause three tracks of magnetic stripe data to be communicated by a card to an external device via an audio jack on the card.

As per another example, a button press on a card may cause information associated with a feature to be communicated from a card to an external device. Accordingly, for example, a feature (e.g., a cardholder information exchange feature) may be activated between two cards after the two cards are coupled via respective audio jacks and a button associated with a cardholder information exchange feature is pressed on one of the cards.

A card may autonomously determine that a device is coupled to an audio jack on the card and then a card's processor may communicate data via the card's audio jack. A card may autonomously determine that a device is removed from an audio jack and then may put a card's processor into sleep mode.

A card may autonomously determine that an audio jack has been extended from a card, which may cause a card's processor to awaken from a sleep mode. A processor may, for example, search for a connection to a card's audio jack once awakened and may communicate information via the audio jack once a connection to a card's audio jack is detected.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which:

FIG. 10 is an illustration of a mobile device constructed in accordance with the principles of the present invention;

FIG. 11 is an illustration of a mobile device constructed in accordance with the principles of the present invention;

DETAILED DESCRIPTION OF THE INVENTION

Figure 1:
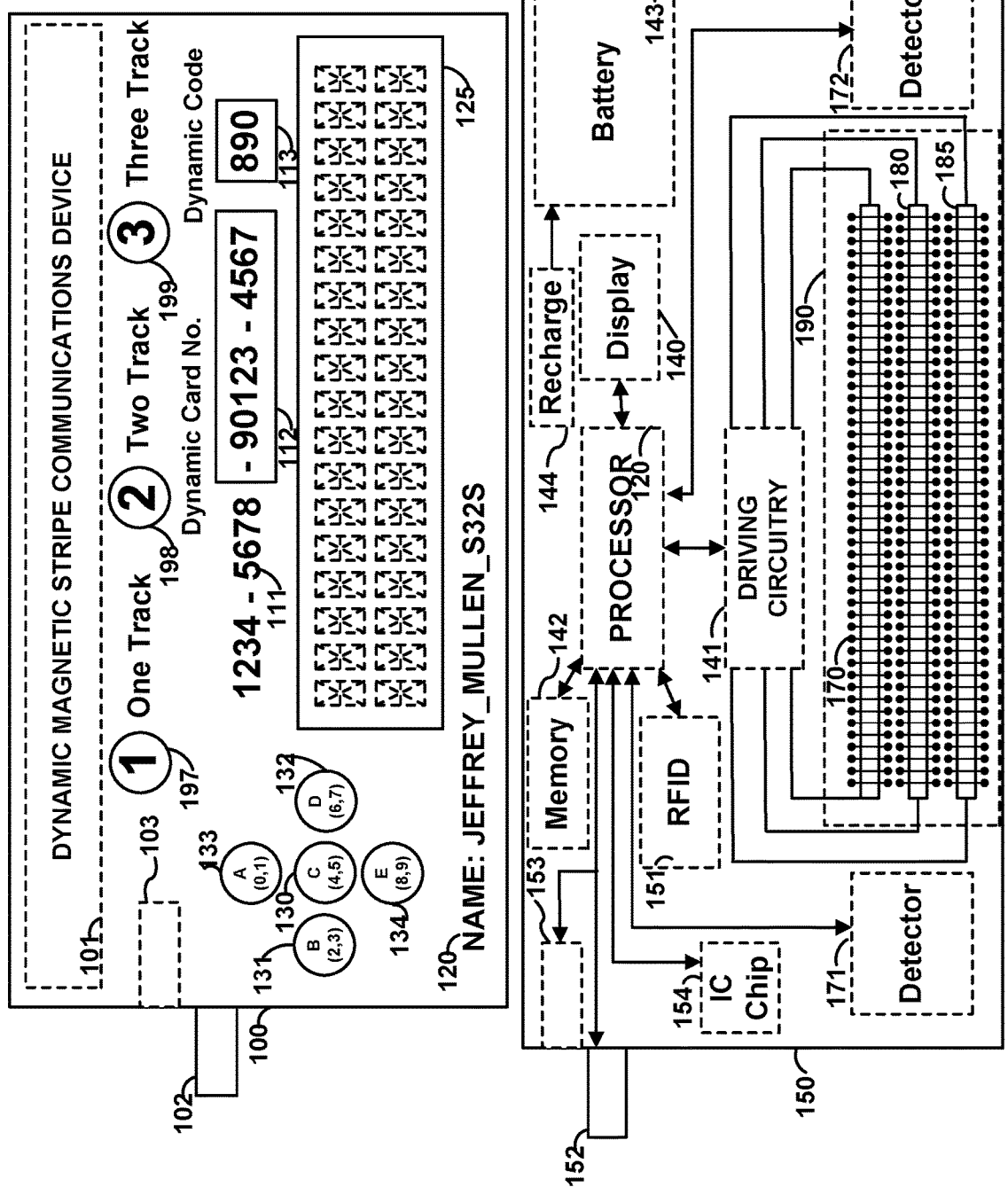
FIG. 1 is an illustration of cards constructed in accordance with the principles of the present invention.

FIG. 1 shows card 100 that may include, for example, a dynamic number that may be entirely, or partially, displayed via display 112. A dynamic number may include a permanent portion such as, for example, permanent portion 111. Permanent portion 111 may be printed as well as embossed or laser etched on card 100. Multiple displays may be provided on a card. For example, display 113 may be utilized to display a dynamic code such as a dynamic security code.

Display 125 may also be provided to display logos, barcodes, as well as multiple lines of information. A display may be a bi-stable display or non bi-stable display. Permanent information 120 may be included and may include information such as information specific to a user (e.g., a user's name or username) or information specific to a card (e.g., a card issue date and/or a card expiration date).

Card 100 may include connector 102, which may be, for example, an audio connector (e.g., a male audio jack). Audio jack 102 may be used to exchange information between card 100 and an external device that may be mechanically and/or electrically coupled to audio jack 102. More particularly, an external device that may be coupled to card 100 via audio jack 102 may communicate information to card 100 and/or may provide power to card 100. An external device that may be coupled to card 100 via audio jack 102 may receive information from card 100.

Card 100 may include connector 103, which may be, for example, an audio connector (e.g., a female audio port). Audio port 103 may be used to exchange information between card 100 and an external device that may be mechanically and/or electrically coupled to audio port 103. More particularly, an external device that may be coupled to card 100 via audio port 103 may communicate information to card 100 and/or may provide power to card 100. An external device that may be coupled to card 100 via connector 103 may receive information from card 100.

Card 100 may include one or more buttons such as buttons 130-134. Such buttons may be mechanical buttons, capacitive buttons, or a combination of mechanical and capacitive buttons. Card 100 may include button 197. Button 197 may be used, for example, to communicate information through connector 102 and/or 103 indicative of a user's desire to communicate one or more tracks of magnetic stripe information. Persons skilled in the art will appreciate that pressing a button (e.g., button 197) may cause information to be communicated through connector 102 and/or connector 103 when, for example, an associated detector detects the presence of an external device coupled to connector 102 and/or 103. Buttons 198 and 199 may be utilized to communicate (e.g., after buttons 198 and 199 are pressed and after a detector detects an external device coupled to connector 102 and/or 103) information indicative of a user selection (e.g., to communicate two or three tracks of magnetic stripe data). Multiple buttons may be provided on a card and each button may be associated with different features.

Architecture 150 may be utilized with any card. Architecture 150 may include processor 120. Processor 120 may have on-board memory for storing information (e.g., application code). Any number of components may communicate to processor 120 and/or receive communications from processor 120. For example, one or more displays (e.g., display 140) may be coupled to processor 120. Persons skilled in the art will appreciate that components may be placed between particular components and processor 120. For example, a display driver circuit may be coupled between display 140 and processor 120.

Memory 142 may be coupled to processor 120. Memory 142 may include data that is unique to a particular card. For example, memory 142 may store discretionary data codes associated with buttons of card 150. Such codes may be recognized by remote servers and/or external devices coupled to card 150 to effect particular actions. For example, a code may be stored on memory 142 that may cause a promotion to be implemented by a remote server (e.g., a remote server coupled to a card issuer's website). A code may be stored on memory 142, for example, that may cause payment data to be exchanged between card 150 and an external device coupled to card 150 via audio jack 152 and/or audio port 153. Memory 142 may store types of promotions that a user may have downloaded to the device and selected on the device for use. Each promotion may be associated with a button. Or, for example, a user may scroll through a list of promotions on a display on the front of the card (e.g., using buttons to scroll through the list).

Any number of reader communication devices may be included in architecture 150. For example, IC chip 154 may be included to communicate information to an IC chip reader. IC chip 154 may be, for example, an EMV chip. As per another example, RFID 151 may be included to communicate information to an RFID reader. A magnetic stripe communications device may also be included to communicate information to a magnetic stripe reader. Such a magnetic stripe communications device may provide electromagnetic signals to a magnetic stripe reader. Different electromagnetic signals may be communicated to a magnetic stripe reader to provide different tracks of data. For example, electromagnetic field generators 170, 180, and 185 may be included to communicate separate tracks of information to a magnetic stripe reader. Such electromagnetic field generators may include a coil wrapped around one or more materials (e.g., a soft-magnetic material and a non-magnetic material). Each electromagnetic field generator may communicate information serially to a receiver of a magnetic stripe reader for a particular magnetic stripe track.

Detectors 171 and/or 172 may be utilized to, for example, sense the presence of a magnetic stripe reader (e.g., a read-head housing of a magnetic stripe reader). This sensed information may be communicated to processor 120 to cause processor 120 to communicate information serially from electromagnetic generators 170, 180, and 185 to magnetic stripe track receivers in a read-head housing of a magnetic stripe reader. Accordingly, a magnetic stripe communications device may change the information communicated to a magnetic stripe reader at any time. Processor 120 may, for example, communicate user-specific and card-specific information through RFID 151, IC chip 154, and electromagnetic generators 170, 180, and 185 to card readers coupled to remote information processing servers (e.g., purchase authorization servers). Driving circuitry 141 may be utilized by processor 120, for example, to control electromagnetic generators 170, 180, and 185.

As per another example, detectors 171 and/or 172 may be utilized to sense a device that may be coupled to card 100 (e.g., an external device that may be connected to audio jack 152 and/or audio port 153). The sensed connection may be communicated to processor 120 to cause processor 120 to perform any operation and/or any communication sequence. For example, recharge circuit 144 may be coupled between audio jack 152 and/or audio port 153 and battery 143 to recharge battery 143 using power received from an external device that may be coupled to audio jack 152 and/or audio port 153.

Figure 2:
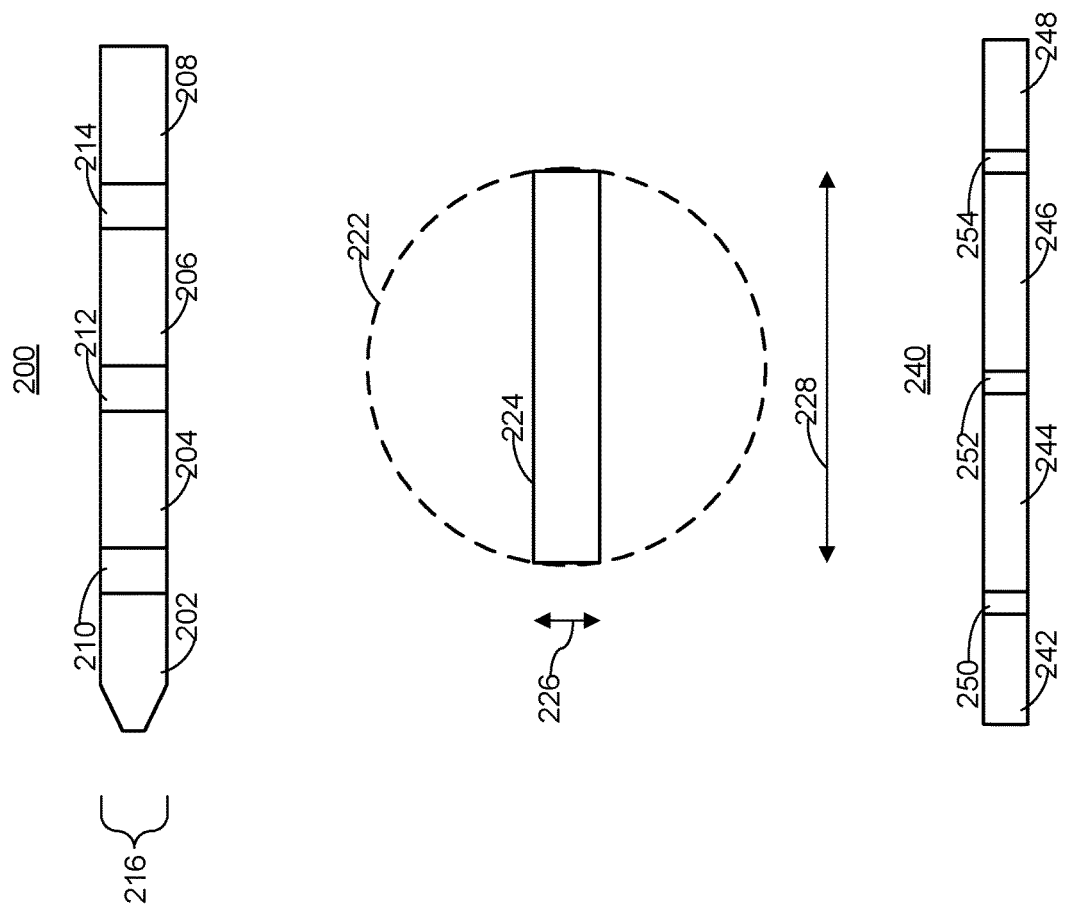
FIG. 2 is an illustration of audio connectors constructed in accordance with the principles of the present invention.

FIG. 2 shows connector 200 (e.g., an audio jack) having diameter 216. Audio jack 200 may include one or more conductive portions (e.g., conductive portions 202-208) and one or more non-conductive portions (e.g., non-conductive portions 210-214). Conductive portions 202-208 may conduct signals such as a power signal, a power reference signal (e.g., ground potential), and/or one or more data signals (e.g., analog and/or digital data signals). Such signals may be processed by, for example, a processor or other control circuitry that may be coupled to audio jack 200.

FIG. 2 shows connector 224 (e.g., an audio jack) that may be any shape (e.g., a rectangle or other polygonal shape) having height 226. Dotted portion 222 shows, for example, a circumference of a connector, such as an analog audio connector, having a diameter larger than height 226. The shape of connector 224 may have a width 228 that is substantially equal to the diameter of dotted portion 222. Connector 224 may have a width 228 that is different. The height may be less than the width. For example, the width may be more than 1 mm and the height may be less than 1 mm (e.g., less than approximately 0.8 mm or less than 0.6 mm).

Connector 224 may have a shape having height 226. Height 226 may, for example, be less than approximately 33 thousandths of an inch. More particularly, height 226 may be between, for example, approximately 10-20 thousandths of an inch. Accordingly, the height 226 of connector 224 may fit within a height of a credit card or a debit card.

Width 228 of connector 224 may be any width. Width 228 may, for example, be substantially equal to a width of any audio connector (e.g., an audio jack, phone plug, jack plug, stereo plug, mini-jack, mini-stereo, or headphone jack). Accordingly, connector 224 may be included within a card having, for example, a height of approximately 30-33 thousandths of an inch. Connector 224 may have a width that is compatible with any number of audio connectors and still fit within a width of a credit card or a debit card.

FIG. 2 shows audio connector 240 that may be included within a card. The audio connector may include conductive portions (e.g., conductive portions 242-248) that may be coupled to a processor and/or other control circuitry that may be included within a card. Non-conductive portions (e.g., non-conductive portions 250-254) may be included within the connector, so that, for example, conductive portions 242-248 do not short together. Accordingly, any number of signals, such as data, power, and power reference (e.g., ground) signals may be provided from a card and/or provided to a card via the audio connector.

Figure 3:
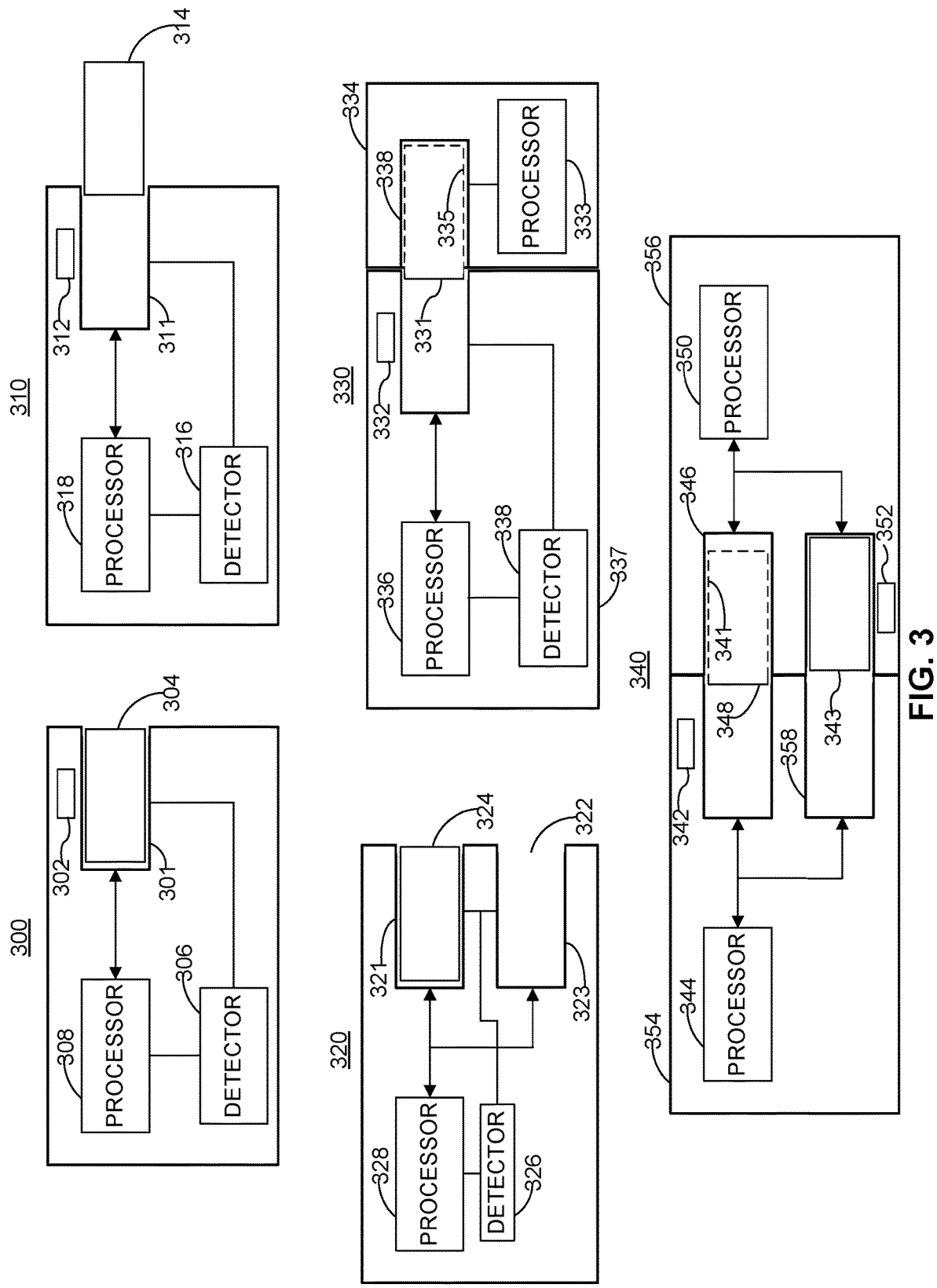
FIG. 3 is an illustration of cards and systems constructed in accordance with the principles of the present invention.

FIG. 3 shows card 300 that may include an audio connector (e.g., audio jack 304 housed within slot 301), processor 308, detector 306, and actuator 302. Audio jack 304 is shown, for example, in a retracted position (e.g., audio jack 304 may be completely enclosed within card 300 via slot 301). Detector 306 may determine that audio jack 304 is in a retracted position as shown and may report the same to processor 308. In response, processor 308 may remain in, or transition into, a sleep mode (e.g., idle state) to, for example, conserve power until audio jack 304 is extended.

Actuator 302 may retract audio jack 304 into slot 301 and/or extend audio jack 304 away from slot 301. Actuator 302 may lock audio jack 304 into one or more of a locked retracted position and a locked extended position.

Card 310 may include audio jack 314 extended away from slot 311 by, for example, pressing or sliding actuator 312. Accordingly, detector 316 may determine that audio jack 314 is in an extended position and may report the same to processor 318. In so doing, processor 318 may prepare to communicate via audio jack 314.

Card 320 may include an audio connector (e.g., audio jack 324) having, for example, male oriented connectivity and an audio connector (e.g., audio port 322) having, for example, female oriented connectivity. Detector 326 may determine, for example, whether audio jack 324 is extended or retracted and may report the same to processor 328. Detector 326 may determine, for example, whether a connector (e.g., an audio jack) is inserted into audio port 322 and may report the same to processor 328.

Processor 328 and/or other control circuitry may communicate and/or receive any type of signal (e.g., power and data signals) to and/or from an external device that may be coupled to card 320 via, for example, audio jack 324 and/or audio port 322. Prior to communication or reception of such signals, processor 328 may be awakened from a sleep state (e.g., an idle state) in response to a detection signal from detector 326. Accordingly, for example, detector 326 may detect the presence of an external device and may cause processor 328 and/or other control circuitry to communicate with the external device via audio jack 324 and/or audio port 322.

System 330 may include card 337 that may be coupled to external device 334. Persons skilled in the art will appreciate that external device 334 may be, for example, a computer, a kiosk, another card, a recharger, a mobile telephonic device (e.g., a cell phone), a programming device, or a PDA. Persons skilled in the art will further appreciate that external device 334 may provide a portal to a network (e.g., the internet) and may provide access to payment systems via the network.

Audio connector (e.g., audio jack 331) may be extended (e.g., by pressing or sliding actuator 332) and may be inserted into corresponding audio connector (e.g., audio port 338) of external device 334. In doing so, for example, conductive portions 335 of audio jack 331 may contact corresponding conductive portions of audio port 338 to provide one or more conductive paths between card 337 and external device 334 to exchange one or more signals between card 337 and external device 334.

External device 334 may, for example, be a recharging device, or other device, that may provide one or more power signals to card 337. In doing so, for example, one or more batteries contained within card 337 may be recharged and/or card 337 may derive operational power from external device 334 during operation of card 337.

External device 334 may, for example, be a programming device that communicates application data (e.g., executable application code) from a controller (e.g., processor 333) to, for example, processor 336 and/or memory within card 337. Persons skilled in the art will appreciate that card 337 may be any type of device that may accept application data (e.g., a card, a cell phone, a computer, a laptop, a PDA or an MP3 player).

As per another example, a card may communicate one or more tracks of magnetic stripe information through an audio jack or an audio port in response to a press of a button. For example, a mobile telephonic device connected to a card may receive magnetic stripe information from a card via the mobile telephonic device's audio connector. An application running on the mobile telephonic device may allow a user to make purchase selections, or enter a payment amount, and use the magnetic stripe information to authorize the purchase or payment. Once the transaction completes, the mobile telephonic device may erase information received from a card and report the results of the transaction on a display of the mobile telephonic device.

A battery-powered card may include buttons that may be associated with corresponding displays, where for example, each button may be associated with a displayed feature. A user may press a button in order to communicate data representative of the feature. A user may be able to select multiple features such that multiple feature codes associated with the selected features are communicated. Features may include, for example, various payment features such as the selection of paying for a purchase with credit, debit, pre-paid points, a deferred payment, a gift, or an installment payment.

In this manner, a single payment card number may be communicated and the transaction may be processed differently based on the selected feature.

System 340 may, for example, include card 354 that may be connected to card 356. Audio connector (e.g. audio jack 348) may be extended by pressing or sliding actuator 342 and inserted into audio connector (e.g., audio port 346) of card 356. Accordingly, for example, conductive portions 341 of audio jack 348 and corresponding conductive portions of audio port 346 mate to provide one or more conductive paths between cards 354 and 356. Audio connector (e.g., audio jack 343) of card 356 may be similarly extended, for example, by pressing or sliding actuator 352 and inserted into the audio connector (e.g., audio port 358) of card 354 to provide additional and/or alternate conductive paths between cards 354 and 356.

Figure 4:
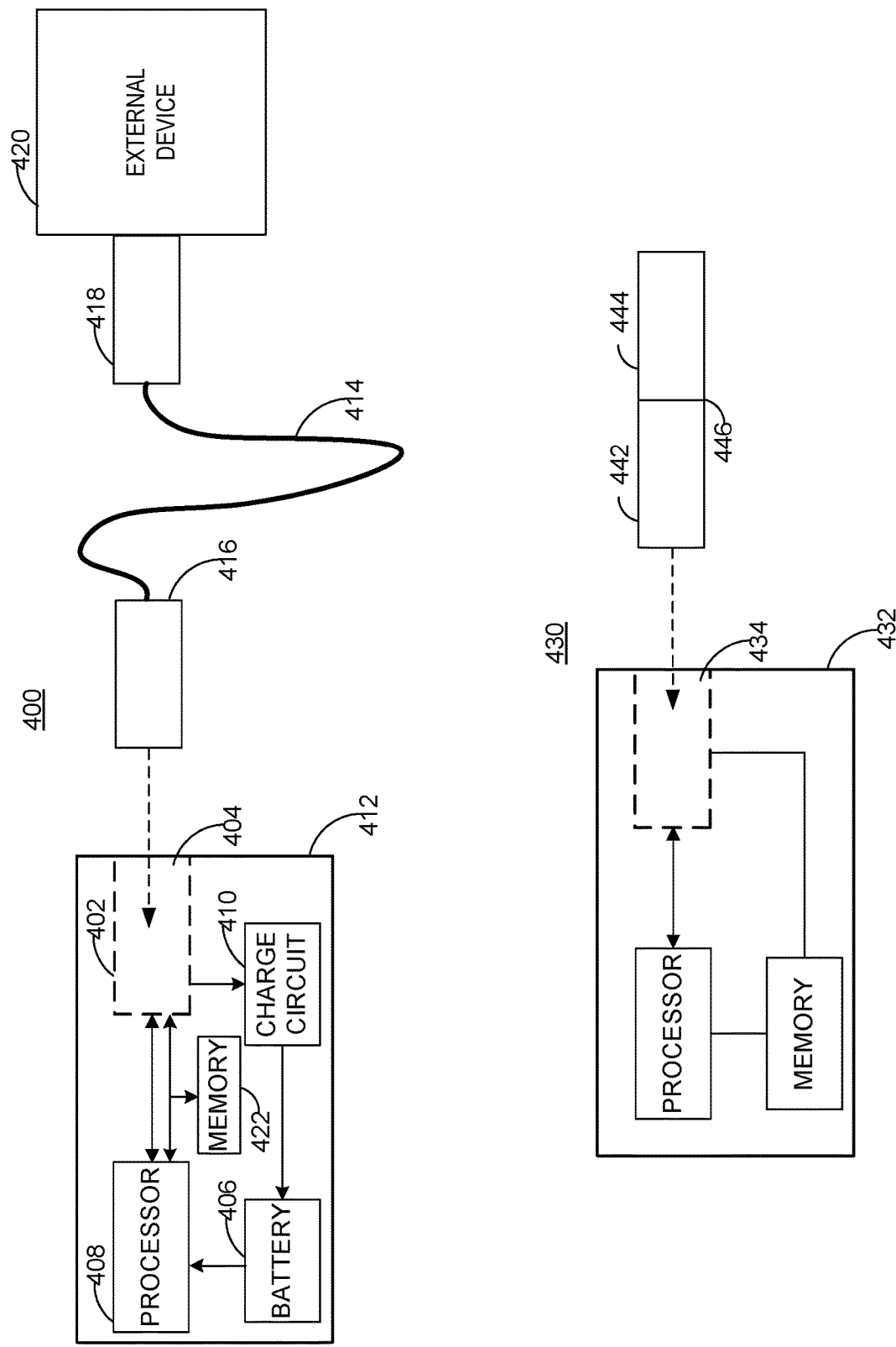
FIG. 4 is an illustration of systems constructed in accordance with the principles of the present invention.

System 400 is shown in FIG. 4. System 400 may include, for example, card 412, cable 414, and external device 420. Cable 414 may include, for example, connector 416 that may be compatible with corresponding connecter 404 (e.g., an audio port or an audio jack) of card 412. Once plugged into card 412, one or more conductors of connector 416 may be coupled to corresponding one or more conductors 402 of connector 404. Cable 414 may include, for example, connector 418 that may be any type of connector (e.g., microphone jack, headphone jack, or USB). Accordingly, for example, one or more conductors of connector 418 may be coupled to corresponding one or more conductors 402 of connector 404 via one or more conductors of cable 414.

External device 420 may be a programming device, a charging device, or any other device. A charging device, for example, may be coupled to card 412 that may, for example, provide electrical energy to card 412 via cable 414. Card 412 may, for example, include charge circuit 410 that may receive a charging signal from external device 420. Such a charging signal may be directly transferred to battery 406 by charge circuit 410 or may be modified (e.g., rectified or regulated) by charge circuit 410 and then transferred to battery 406. In so doing, for example, battery 406 may be recharged with electrical energy received from external device 420.

A programming device, for example, may be coupled to card 412 that may, for example, provide application data, financial data, cardholder data, or any other type of data to card 412. Handshaking may, for example, be exchanged between external device 420 and card 412 to communicate data from external device 420 to card 412. In so doing, communicated data may be stored within memory 422 of card 412.

Application data may be provided by external device 420 and may be stored within memory 422 to define features of card 412. For example, one or more features of card 412 may be associated with a manual interface (e.g., one or more buttons) included with card 412. Accordingly, for example, a button press on card 412 may cause a particular operation to be performed by card 412 (e.g., one or more tracks of magnetic stripe data may be communicated to conductors 402 of connector 404 by processor 408) as defined by application data stored within memory 422.

Financial data may be provided by external device 420 and may be stored within memory 422 of card 412. Financial data may include, for example, one or more payment card accounts (e.g., gift card, credit card, and debit card accounts) and associated payment data (e.g., payment card account numbers, payment card account types, expiration dates, and associated additional data).

Accordingly, for example, a button of card 412 may be pressed and financial data associated with the pressed button may be communicated to conductors 402 of connector 404 by processor 408. In so doing, for example, external device 420 (e.g., mobile telephonic device, laptop computer, desktop computer, or electronic tablet) may receive the financial information and may communicate the financial information via a network (e.g., the internet) to settle payment for an on-line purchase or on-line payment initiated by external device 420.

System 430 is shown in FIG. 4. System 430 may include, for example, card 432 and external connector 446. External connector 446 may include, for example, portion 442 and portion 444. Portion 442 may, for example, be compatible with corresponding connecter 434 (e.g., audio port or audio jack) of card 432, so that once plugged into card 432, portion 442 may electrically and/or mechanically couple to connector 434. Portion 444 may be a serial connector (e.g., USB or RS-232 connector), a parallel connector, an ethernet connector, or any other type of connector that may be required to couple card 432 to an external device.

Figure 5:
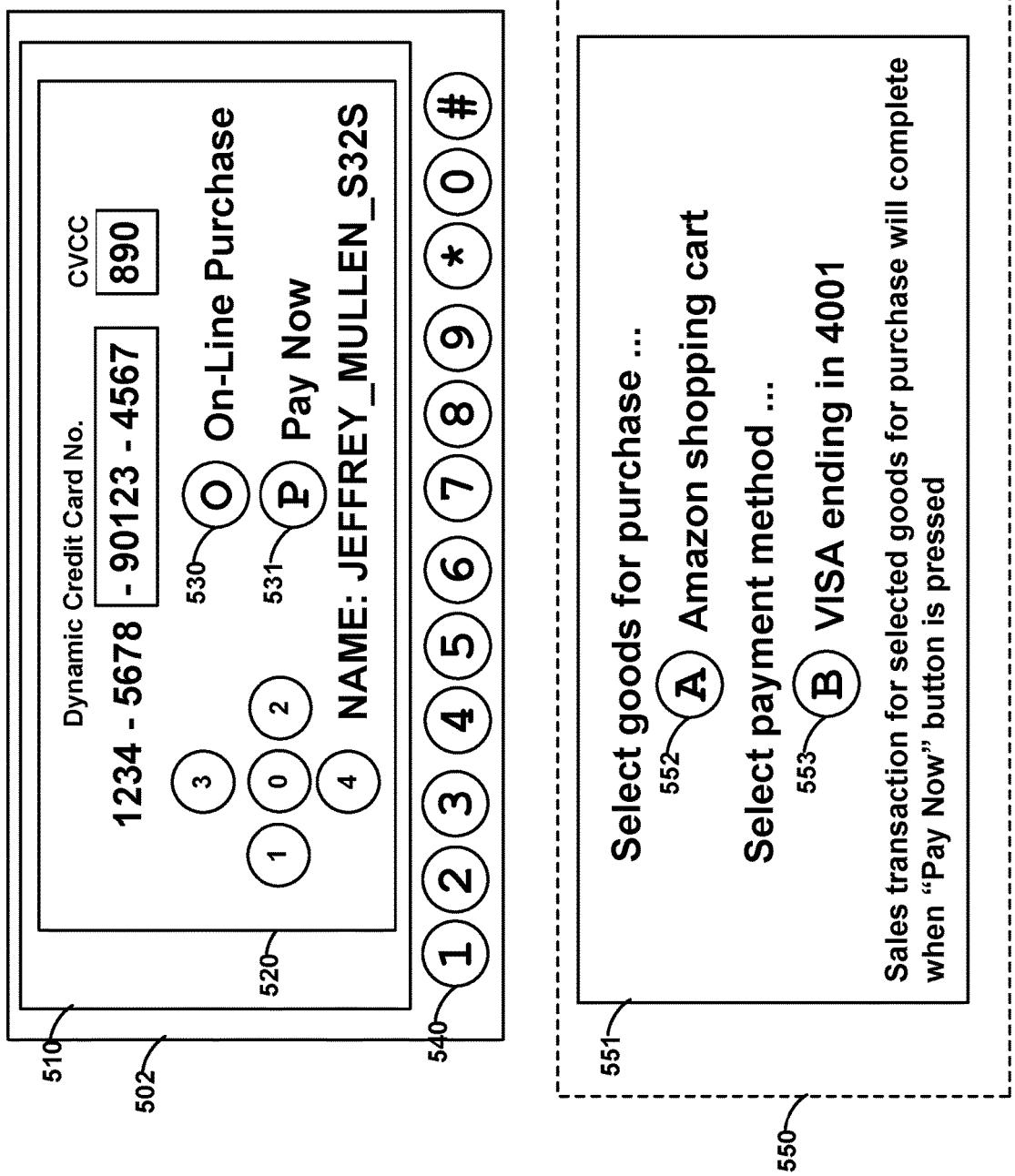
FIG. 5 is an illustration of a mobile device constructed in accordance with the principles of the present invention.

FIG. 5 shows device 500 that may be, for example, a mobile telephonic device such as a mobile cellular phone. Any card provided herein may be provided as a virtual card on device 500. Mechanical buttons 540 may be utilized by a user to make selections (e.g., selections associated with a virtual card). Virtual buttons may be included that a user can activate (e.g., by utilizing a touch-screen displaying a virtual card) so that the user can make selections associated with the virtual card. Device 500 may include, for example, housing 502, display 510, virtual card 520, and virtual buttons 530 and 531. Device 500 may communicate to a card reader via electromagnetic signals (e.g., RF signals). Device 500 may communicate to a network (e.g., the internet) via Wi-Fi capability of device 500. Device 500 may communicate to a network (e.g., a telephonic communication network) via telephonic communication capabilities of device 500.

Virtual button 530 may be associated with one or more on-line purchase selections (e.g., goods selected by device 500 during an internet browsing session conducted by device 500). Button 531 may be associated with using a particular payment card account (e.g., credit, debit, or pre-paid account) to complete an on-line purchase transaction. Device 500 may, for example, receive payment card account information from a payment card that may be coupled to an audio jack of device 500. Activation of button 531 may, for example, cause such payment card account information to be communicated by device 500 to a remote server to complete an on-line purchase transaction selected by device 500.

Display configuration 550 may be provided and may be displayed, for example, on a wireless device such as a wireless telephonic device or a wireless payment card. Configuration 550 may include graphical user interface 551 that may include, for example, virtual button 552 and virtual button 553. A user may, for example, be provided with a feature of selecting goods for purchase by pressing virtual button 552 that is associated with such a feature (e.g., selection of goods associated with an Amazon shopping cart generated by device 500 during an on-line shopping spree).

A user may be provided with a feature of selecting a payment method by pressing virtual button 553 that is associated with such a feature (e.g., selection of a payment card account previously communicated to device 500 via an audio jack connection with a payment card) to use during completion of a purchase transaction. A user may perform a selection by pressing the virtual button associated with the selection. Information associated with each selection may be provided, for example, to a remote server (e.g., via a telephonic data communication). The remote server may then complete processing of a selected purchase using the selected payment card account information.

Figure 6:
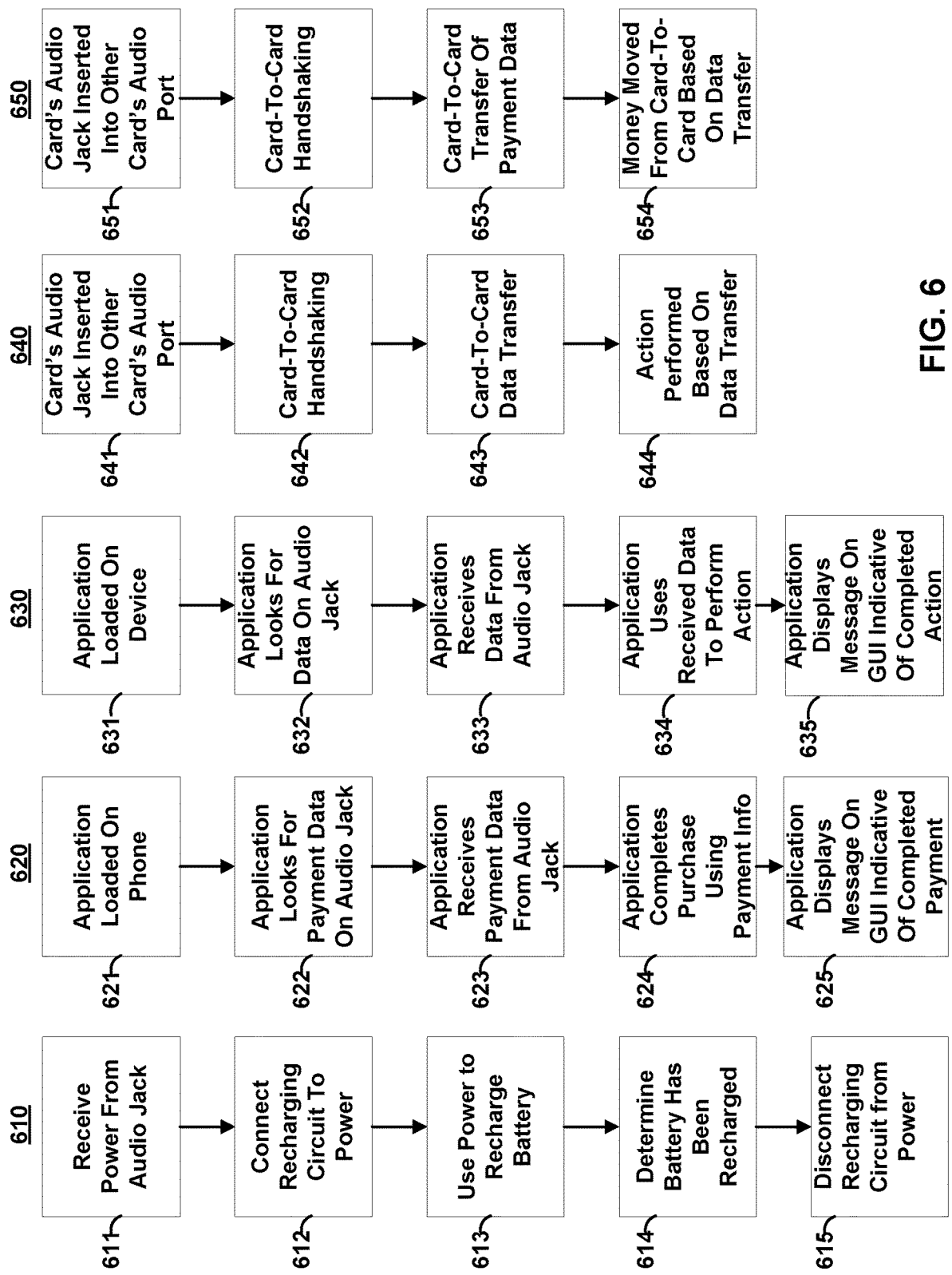
FIG. 6 is an illustration of process flow charts constructed in accordance with the principles of the present invention.

FIG. 6 shows flow charts of sequences 610-650. Sequence 610 may include, for example, receiving a power signal from an audio jack, as in step 611, and connecting a recharge circuit to the received power signal as in step 612. For example, a power signal that may be coupled to an audio jack of a card may be automatically coupled to a recharge circuit of the card. As per another example, a detector of a card may detect that a power signal is coupled to the card. A detector may, for example, detect that a battery of a card is in need of recharging. In so doing, for example, a detector may detect the existence of a power signal and may couple the power signal to a charging circuit of the card.

A charging circuit of a card may apply the power signal directly to a battery of the card or may modify (e.g., rectify or regulate) the power signal before applying the power signal to the battery as in step 613. A recharging circuit may monitor a recharging activity of a battery of a card. Accordingly, for example, a recharging circuit of a card may determine whether the battery has been recharged as in step 614. In so doing, for example, an indicator of the card (e.g., an LED) may indicate the recharged condition and a user of the card may remove the power signal from an audio jack of the card as in step 615. As per another example, a recharging circuit of a card may autonomously disconnect itself from the power signal when recharging is complete as in step 615.

Sequence 620 may include, for example, loading an application on a phone, as in step 621, and executing the application on the phone to look for payment data to arrive on an audio jack of the phone, as in step 622. For example, a card may be coupled to a phone via the phone's audio jack. A button press on the card may, for example, cause payment data to be communicated from the card to the phone (e.g., a cable may be connected between a card's audio jack and a phone's audio jack and payment data may be communicated from the card to the phone via the connected audio jacks). The communicated payment data may be received by an application on the phone, as in step 623, and may be stored in memory of the phone for future use.

A user of a phone may, for example, select goods for purchase using another application loaded on the phone (e.g., a user of the phone may select goods for purchase using a web browser application on the phone). A user's purchase selections may be settled by a purchase transaction conducted by the application, as in step 624, using the payment data received, for example, in step 623. Upon completion of the purchase transaction, a message on a GUI of the phone may indicate the outcome of the transaction (e.g., successful completion) as in step 625.

Sequence 630 may include, for example, loading an application on a phone, as in step 631, and executing the application to detect data being communicated to the phone via the phone's audio jack as in step 632. For example, a card (e.g., an identification card) may be coupled to a phone via a connection between an audio jack of the card and an audio jack of the phone (e.g., an audio jack may be extended from the card and the card may be plugged into an audio port of the phone via the extended audio jack of the card). A button may, for example, be pressed on the card and an associated feature may be executed by the card (e.g., a portion, or all, of the identification information contained within a memory of the card may be communicated to the phone via the respective audio jack connections between the card and the phone).

An application executing on the phone may receive the data, as in step 633, and may, for example, store the received data, as in step 634, and may acknowledge receipt of the data, as in step 635. For example, one or more identification cards may be coupled to a phone and information received from each identification card (e.g., as in step 633) may be compiled by the phone into a contact list (e.g., as in step 634) that may be subsequently accessed by the user of the phone (e.g., a GUI of the phone may display the compiled contact list to the user) after the phone reports completion of the updated contact list (e.g., as in step 635).

Sequence 640 may include, for example, inserting a card's audio jack into another card's audio port, as in step 641. For example, a card's audio jack may be extended and locked into an extended position through use of an actuator on the card. The extended and locked audio jack may then be inserted into, for example, an audio port of another card. Card-to-card handshaking and card-to-card data transfer may be performed, as in steps 642 and 643. For example, data files (e.g., music files) may be shared between two cards when a music share feature is activated (e.g., by pressing a button associated with a music share feature on one of the cards). In step 644, an action may be performed based upon the data transferred (e.g., a play list may be updated in a card based upon one or more music files transferred to the card from another card).

Sequence 650 may include inserting a card's audio jack into another card's audio port, as in step 651, performing card-to-card handshaking, as in step 652, performing card-to-card transfer of payment data, as in step 653, and performing a card-to-card money transfer, as in step 654.

Accordingly, for example, an audio jack of a gift card may be inserted into an audio port of another gift card to effect a money transfer from one card to another card. In so doing, for example, a portion, or all, of a money balance of one gift card may be transferred to and accumulated by the money balance of another gift card. As per another example, account information for multiple card accounts (e.g., gift card merchant identification and account balance information) from multiple cards may be consolidated onto a single card.

Figure 7:
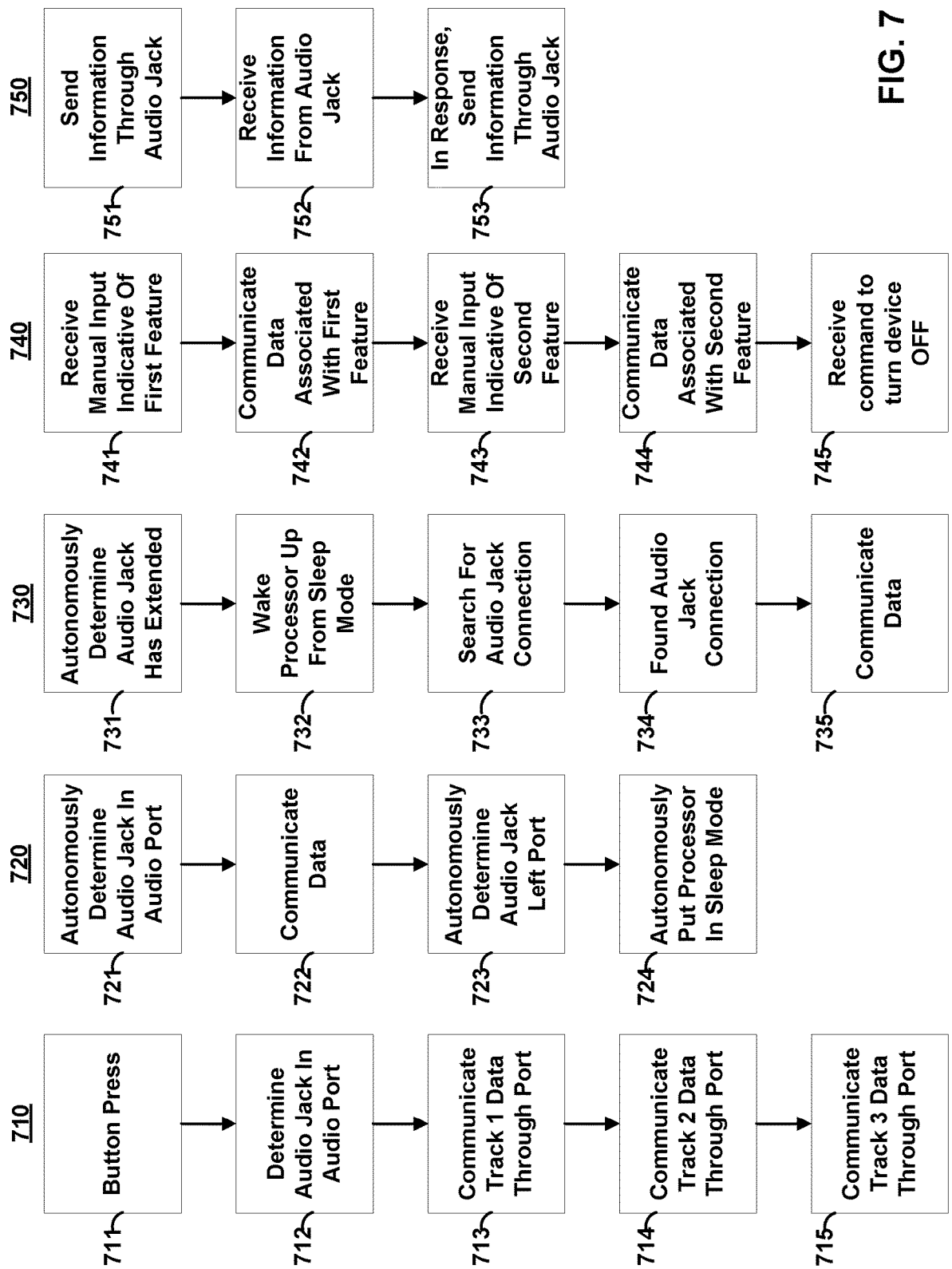
FIG. 7 is an illustration of process flow charts constructed in accordance with the principles of the present invention.

FIG. 7 shows flow charts of sequences 710-750. Sequence 710 may include, for example, pressing a button on a card, as in step 711, and determining that an audio jack is inserted into an audio port, as in step 712. For example, a button on a card may be pressed and a feature associated with that button may be activated. Accordingly, for example, a detector on a card may be activated (e.g., via a button press) to determine that an audio jack of a card is coupled to an external device (e.g., an audio jack of a card is connected to an audio port of an external device). In so doing, for example, a detector of a card may determine that a card's audio jack is coupled to virtually any external device (e.g., another card, a mobile telephonic device, a laptop, or a PDA) and data may, for example, be communicated to the external device after such a detection.

A portion, or all, of a first track of magnetic stripe information, for example, may be communicated, as in step 713, from the audio jack of a card to an external device coupled to the audio jack of the card when a button is pressed and when the card's audio jack is determined to be inserted into an audio port of an external device. A portion, or all, of first and second tracks of magnetic stripe information, for example, may be communicated, as in steps 713 and 714, from the audio jack of a card to an external device coupled to the audio jack of the card when a button is pressed and when the card's audio jack is determined to be inserted into an audio port of an external device. A portion, or all, of first, second, and third tracks of magnetic stripe information, for example, may be communicated, as in steps 713-715, from the audio jack of the card to an external device coupled to the audio jack of the card when a button is pressed and when a card's audio jack is determined to be inserted into an audio port of an external device.

Sequence 720 may include, for example, autonomously determining whether an audio jack of a card is inserted into an audio port of an external device as in step 721. For example, a detector of a card may detect continuity (e.g., electrical continuity) between one or more conductors of a card's audio jack and corresponding one or more conductors of a corresponding audio port. When continuity is detected, for example, data may be communicated, as in step 722, by a processor of the card to one or more conductors of a card's audio jack to data transfer to an external device coupled to the card's audio jack.

Step 723 may include, for example, autonomously determining that an audio jack is removed from an audio port. For example, a detector of a card may detect a loss of continuity (e.g., electrical continuity) between one or more conductors of a card's audio jack and corresponding one or more conductors of a corresponding audio port. When loss of continuity is detected, for example, a processor of a card may be placed into a sleep mode, as in step 724. For example, a processor of a card may be placed into a low-power mode of operation after an audio jack of the card is detected as being inserted into an audio port, after data is communicated to the audio port via the audio jack of the card, and after the audio jack of the card is detected as being removed from the audio port.

Step 731 of sequence 730 may include, for example, autonomously determining whether an audio jack has been extended away from a card. For example, an audio jack of a card may be partially, or fully, retracted into a slot of a card. An actuator (e.g., a mechanical actuator) of a card may, for example, be activated to extend the audio jack away from its retracted position and may, for example, lock the audio jack into an extended position. In step 732, a processor of a card may be awakened after the audio jack of the card is extended. For example, a processor of a card may exist in a low-power mode of operation until an audio jack of the card is extended. Afterwards, the processor may begin a normal mode of operation whereby, for example, a search for a connection to a card's audio jack, as in step 733, commences. Upon detection of a connection to a card's audio jack, as in step 734, a processor of the card may communicate data via the card's audio jack as in step 735.

Step 741 of sequence 740 may include, for example, receiving manual input indicative of a first feature. For example, a card may include a feature associated with a button on the card that when pressed, causes the card to communicate, as in step 742 for example, payment information from the card to an external device coupled to the card (e.g., payment card account information may be downloaded from a card into a mobile telephonic device via a connection between respective audio connectors of the card and the mobile telephonic device).

Step 743 of sequence 740 may include, for example, receiving manual input indicative of a second feature. For example, a mobile telephonic device (e.g., a cell phone) may include a manual input interface (e.g., a GUI having virtual buttons for receiving manual input). The GUI may include, for example, one or more virtual buttons that may be associated with corresponding one or more features. A feature may, for example, be associated with a button that when pressed, may cause the mobile telephonic device to communicate, as in step 744 for example, payment information to a remote server in order to complete a purchase transaction.

Accordingly, for example, a user of a mobile telephonic device (e.g., a cell phone) may browse (e.g., via a Wi-Fi connection between the cell phone and the internet) for goods and/or services that may be purchased. Upon checkout, rather than typing payment card account information into the mobile telephonic device, a user of the mobile telephonic device may instead connect an audio connector of a payment card to a corresponding audio connector of the mobile telephonic device and transfer payment card account information from the card to a remote server, via the mobile telephonic device, to complete the transaction. In so doing, for example, a user may press a button on the payment card to transfer payment card account information to the mobile telephonic device and then may press a button on the mobile telephonic device, or a virtual button on a GUI of the mobile telephonic device, to transfer the payment card account information from the mobile telephonic device to the remote server to complete the transaction. Once the transaction is completed, the user may power the card and/or the mobile telephonic device off (e.g., as in step 745).

As per another example, a user of a mobile telephonic device (e.g., a cell phone) may have previously transferred and saved payment card account information into a memory of the mobile telephonic device. In so doing, for example, a user of the mobile telephonic device may select a button on the mobile telephonic device, or a virtual button on a GUI of the mobile telephonic device, to recall payment card account information from a memory of the mobile telephonic device and then communicate the recalled information to a remote server to complete a purchase transaction.

Sequence 750 may include, for example, sending information through an audio jack, as in step 751, receiving information from the audio jack, as in step 752. In response, information may be sent through the audio jack, as in step 753.

For example, a card may be coupled to an external device (e.g., another card, a cell phone, a laptop computer, a desktop computer, or a PDA) via respective audio connectors of the card and the external device. A user of the card may, for example, select a feature on the card (e.g., by pressing a button on the card associated with the feature) which may, for example, cause the card to transfer data to the external device. Prior to initiation of the data transfer, the card may request (e.g., via step 751) authentication information from the external device. The external device may then ask the user for authenticating information (e.g., a display of the external device may display a challenge to the user to enter either a PIN or a password in order to authorize the data transfer) and may then communicate the user's response back to the card (e.g., as in step 752). Upon receipt of the user's response and verification that the user's response is valid, the card may then transfer the requested data (e.g., medical information as in step 753) from the card to the external device.

Figure 8:
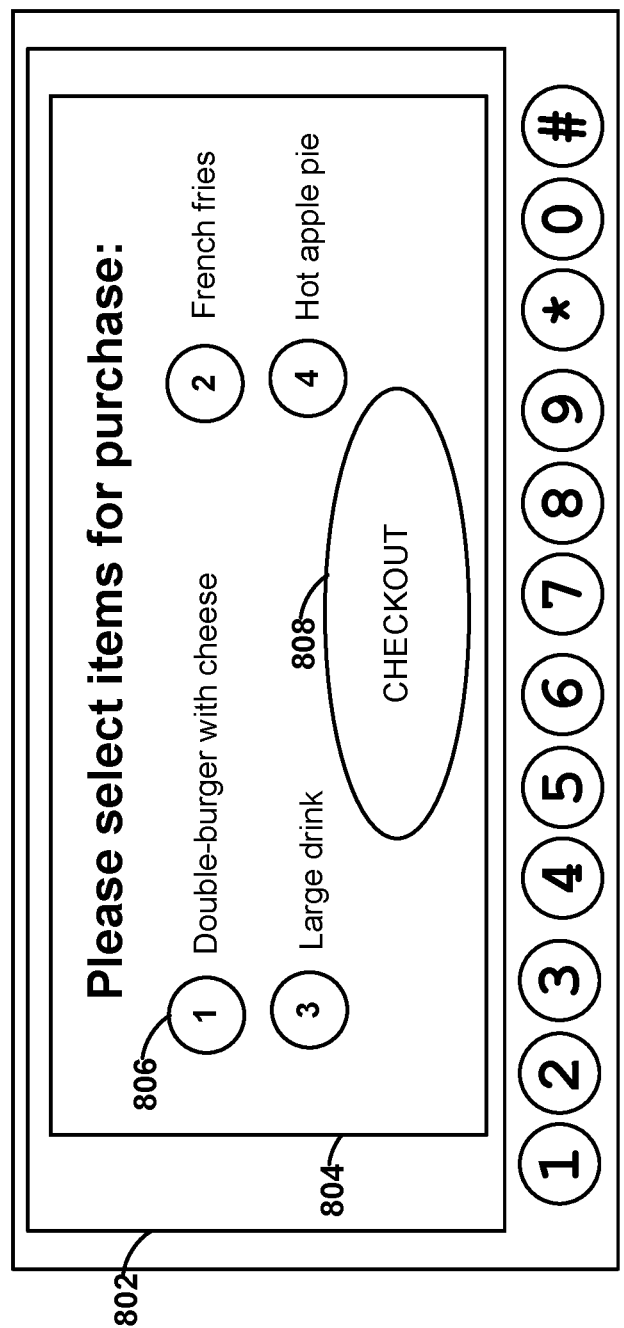
FIG. 8 is an illustration of a mobile device constructed in accordance with the principles of the present invention.

FIG. 8 shows mobile telephonic device 800, which may include display 802 that may provide visible content (e.g., graphics, text and other rich content). Display 802 may, for example, be touch sensitive so that display 802 may display virtual input mechanisms (e.g., virtual buttons 806 on GUI 804). Display 802 may, for example, provide other data input mechanisms (e.g., text input mechanisms). Display 802 may, for example, display content that may be downloaded to mobile telephonic device 800 via one or more wireless interfaces provided by mobile telephonic device 800.

In so doing, for example, a user of mobile telephonic device 800 may, for example, physically visit a merchant's place of business and may, at the same time, be virtually visiting the merchant via that merchant's web site. A user may, for example, select items for purchase via that merchant's website. A user may, for example, select items for purchase that may be downloaded into mobile telephonic device 800 by another wireless device (e.g., an RFID device at the merchant's place of business that communicates items for purchase to mobile telephonic device 800). Accordingly, for example, a merchant may provide content accessible from mobile telephonic device 800 that allows a user of mobile telephonic device 800 to interact with the content to select items for purchase.

Accordingly, a user of mobile telephonic device 800 may visit a merchant's physical place of business, while selecting items for purchase that is rendered onto GUI 804 of display 802 of mobile telephonic device 800. A user may, for example, complete such a purchase via a mobile telephonic device 800 by communicating payment card account information from mobile telephonic device 800 that may have been downloaded into mobile telephonic device 800 via one or more payment cards that may be coupled to mobile telephonic device 800.

A user of mobile telephonic device 800 may, for example, physically visit his or her favorite restaurant and simultaneously select items to purchase (e.g., food items 806) from that restaurant's website. A user may, for example, select food items 806 for purchase by virtually activating buttons 806 that may be associated with each food item (and the quantity of each food item) that is desired to be purchased. Once a purchase selection is finalized, a user may communicate such a purchase selection (e.g., by activating virtual button 808) to that restaurant via, for example, one or more wireless communication interfaces provided by mobile telephonic device 800.

Figure 9:
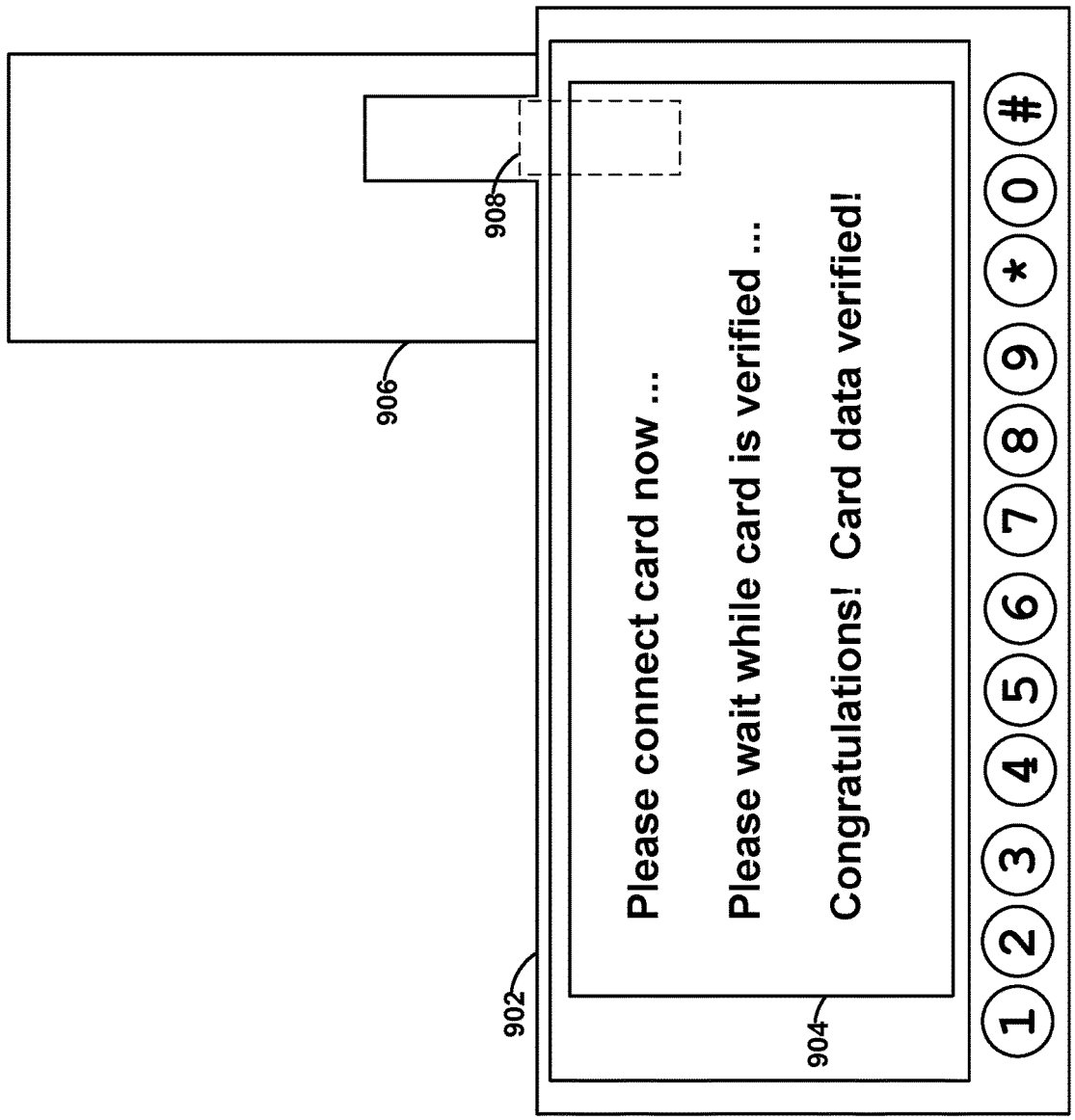
FIG. 9 is an illustration of a system constructed in accordance with the principles of the present invention.

FIG. 9 shows system 900 that may include, for example, mobile telephonic device 902 and card 906. GUI 904 of mobile telephonic device 902 may display content that may prompt the user of mobile telephonic device 902 to download payment card account information into mobile telephonic device 902 to complete a transaction. For example, a user may be asked to connect card 906 to mobile telephonic device 902 via audio connector 908 of card 906 and a corresponding audio connector of mobile telephonic device 902. As per another example, a mobile magnetic card swipe device may be inserted into an audio connector of mobile telephonic device 902. In so doing, for example, a card may be swiped through a mobile magnetic card swipe device and the corresponding one, two and/or three tracks of magnetic stripe data may be communicated from the card to mobile telephonic device 902 via the mobile magnetic card swipe device. Once payment card data that is communicated to mobile telephonic device 902 via card 906 is verified, GUI 904 may report, for example, that the payment card data has been successfully downloaded and verified.

FIG. 10 shows mobile telephonic device 1000 that may, for example, render GUI 1002 onto a display of mobile telephonic device 1000. GUI 1002 may, for example, provide a user of mobile telephonic device 1000 with a variety of payment options 1004. For example, a purchase being transacted via mobile telephonic device 1000 may allow the purchase transaction to be split into multiple payment accounts. In so doing, for example, a user of mobile telephonic device 1000 may connect an audio connector of more than one payment card to mobile telephonic device 1000 and may download payment card account information from the more than one payment cards into mobile telephonic device 1000. As per another example, payment card account information may already be located in the memory of mobile telephonic device 1000 and may be recalled for use in a split purchase.

FIG. 11 shows, for example, GUI 1102 that may be displayed by mobile telephonic device 1100 allowing a user of mobile telephonic device 1100 to split a payment into two or more payment methods. GUI 1102 may, for example, display multiple payment accounts and buttons 1104 associated with the multiple payment account options. A user may, for example, press a button associated with two or more payment accounts and then use the selected payments accounts to complete a purchase. A user may, for example, enter an amount that is to be charged to each payment account selected.

As per another example, mobile telephonic device 1100 may access remote servers associated with the payment accounts stored within mobile telephonic device 1100 to determine any rewards points that may be associated with such payment accounts. Accordingly, for example, the accessed points information may be displayed on GUI 1102 and may be selected by a user of the mobile telephonic device as an alternate or supplemental payment option.

Figure 12:
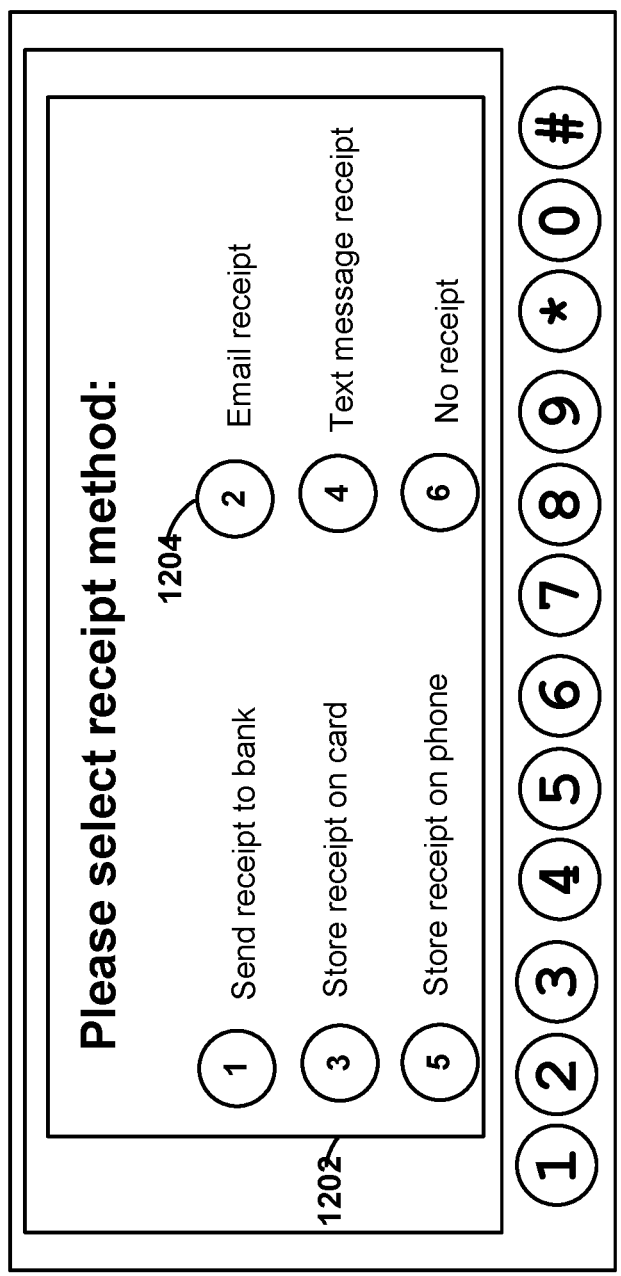
FIG. 12 is an illustration of a mobile device constructed in accordance with the principles of the present invention.

FIG. 12 shows, for example, GUI 1202 that may be displayed on a display of mobile telephonic device 1200. GUI 1202 may, for example, provide a user of mobile telephonic device 1200 with varying receipt options 1204. For example, a user may activate a virtual button on GUI 1202 to select an associated option for a receipt for a purchase transaction to be generated by an on-line merchant and provided to the user's bank. A user may, for example, activate a virtual button on GUI 1202 to select an associated option for a receipt for the purchase transaction to be provided to the user via the user's email or text messaging account. A user may, for example, activate a virtual button on GUI 1202 to select an associated option for a receipt for the purchase transaction to be generated and delivered to mobile telephonic device 1200 for storage within a memory of mobile telephonic device 1200.

As per another example, a user may connect a card to mobile telephonic device 1200 via respective audio connectors of the card and the mobile telephonic device 1200. In so doing, a user may activate a virtual button on GUI 1202 to select an associated option for a receipt for the purchase transaction to be generated and delivered to mobile telephonic device 1200 and automatically uploaded into a card via an audio connection between the card and mobile telephonic device 1200.

Figure 13:
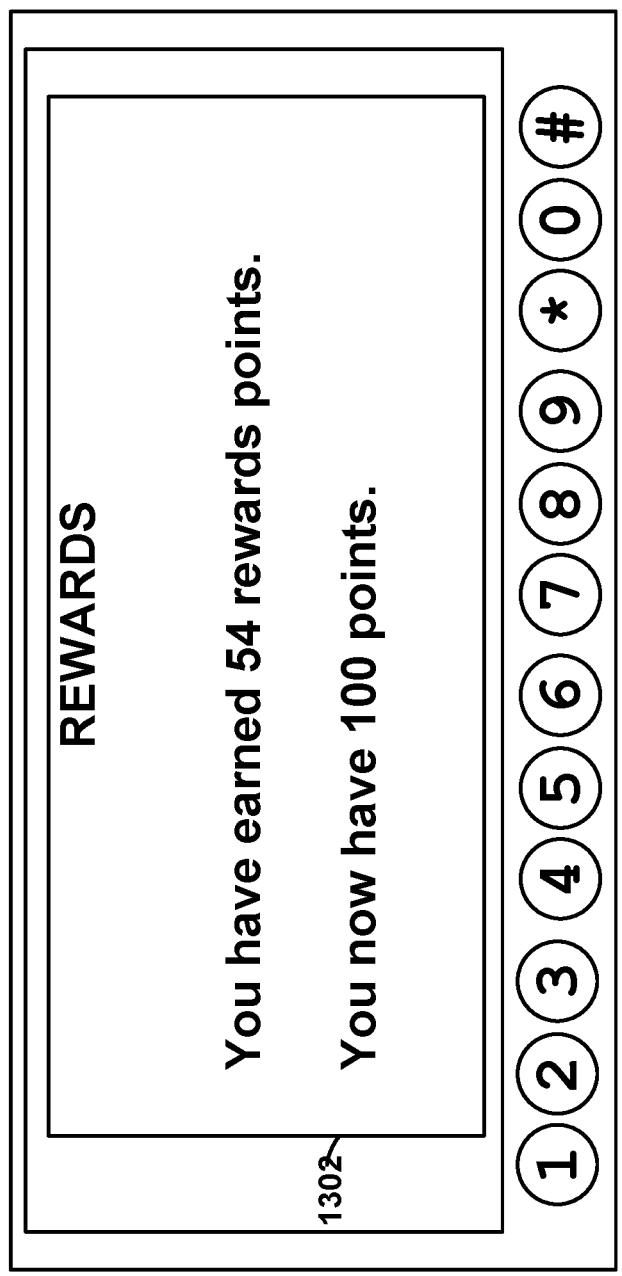
FIG. 13 is an illustration of a mobile device constructed in accordance with the principles of the present invention.

FIG. 13 shows, for example, GUI 1302 that may be displayed on a display of mobile telephonic device 1300. Upon settlement of a purchase transaction, for example, a remote server may communicate a number of rewards points that may have been earned by a user before and after the purchase transaction. Mobile telephonic device 1300 may receive the rewards points update from the remote server and report the same to the user via GUI 1302 of mobile telephonic device 1300.

Figure 14:
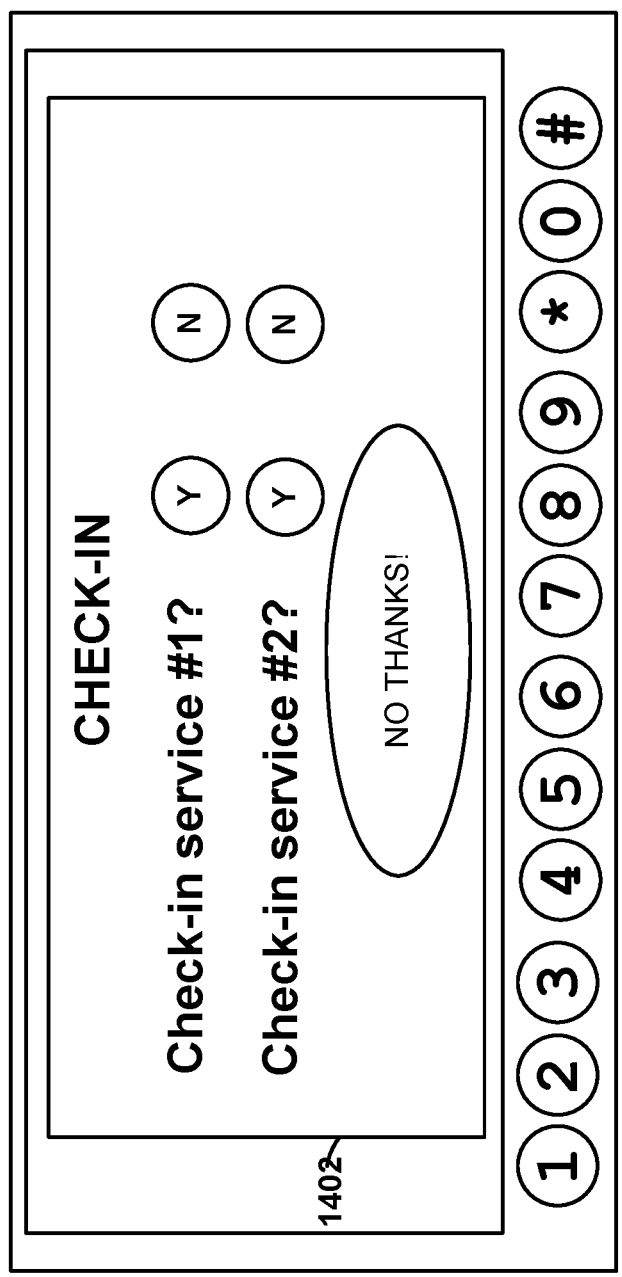
FIG. 14 is an illustration of a mobile device constructed in accordance with the principles of the present invention.

FIG. 14 shows GUI 1402 that may be displayed on a display of mobile telephonic device 1400. For example, GUI 1402 may provide a user of mobile telephonic device 1400 with an opportunity to check-in with various web-based services to report the activities of the user. For example, a user may activate a virtual button associated with one or more check-in services or may decline to check in at all.

Accordingly, for example, a user may utilize mobile telephonic device 1400 to complete a purchase transaction at a merchant's place of business and may elect to register the purchase activity with an on-line check-in service. Mobile telephonic device 1400 may, for example, track certain details about a particular purchase transaction (e.g., merchant location, purchase amount, and items purchased) and may automatically post such details with the check-in services activated.

Figure 15:
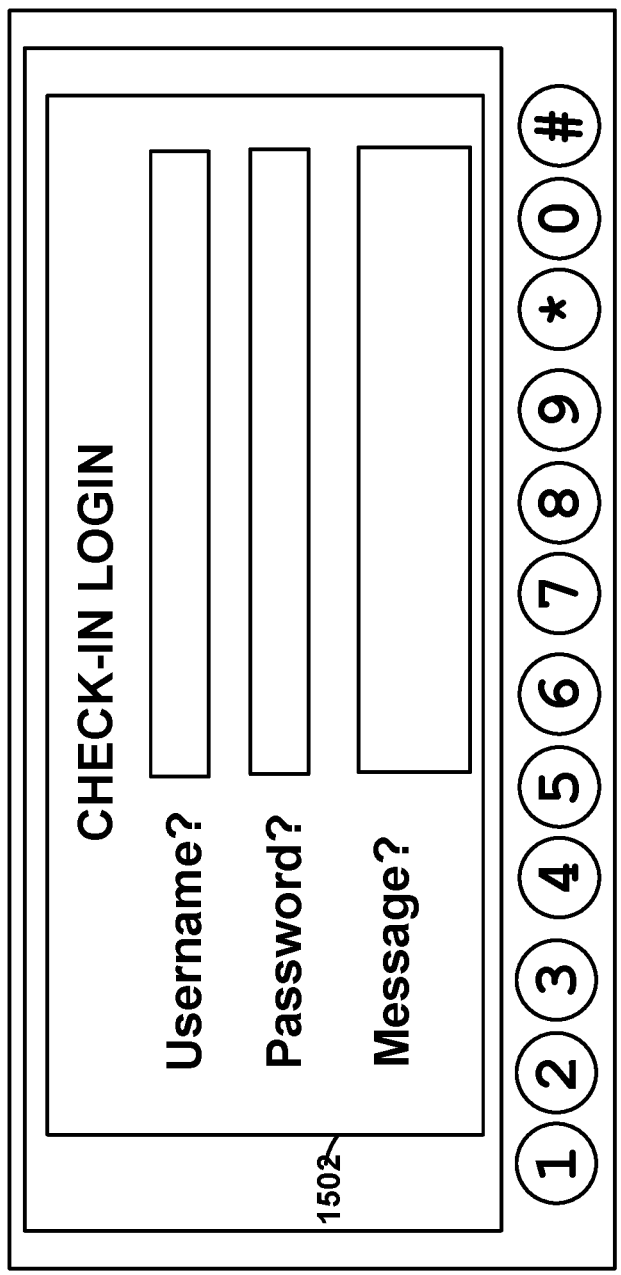
FIG. 15 is an illustration of a mobile device constructed in accordance with the principles of the present invention.

FIG. 15 shows GUI 1502 that may be displayed on a display of mobile telephonic device 1500. For example, GUI 1502 may provide a user of mobile telephonic device 1500 the ability to log into a check-in service using username and password text entry boxes provided by GUI 1502. Mobile telephonic device 1500 may, for example, access the webpage associated with the selected service, log into the selected service using username and password information provided by the user within GUI 1502 and then post the activity information onto the check-in service's web site that may be associated with a purchase transaction completed by mobile telephonic device 1500. A message (e.g., "I'm eating at McDonalds on Main Street and will be here for another 15 minutes") may, for example, be added by a user of mobile telephonic device 1500 to accompany the activity information posted to the selected check-in service's web site by mobile telephonic device 1500.

Persons skilled in the art will appreciate that the present invention is not limited to only the embodiments described. Instead, the present invention more generally involves dynamic information. Persons skilled in the art will also appreciate that the apparatus of the present invention may be implemented in other ways then those described herein. All such modifications are within the scope of the present invention, which is limited only by the claims that follow.

What is claimed is:

1. A device, comprising:
    a male analog audio jack operable to recharge a battery while communicating at least one electronic data signal.

* * * * *